US010013687B2

(12) United States Patent
Kanisawa et al.

(10) Patent No.: US 10,013,687 B2
(45) Date of Patent: Jul. 3, 2018

(54) CHARGE PAYMENT SYSTEM USING VIRTUAL MONEY

(75) Inventors: Keina Kanisawa, Tokyo (JP);
Yasuyuki Nagatomo, Tokyo (JP);
Yusuke Kitakaze, Tokyo (JP); Koji Makino, Tokyo (JP); Jiro Hotta, Tokyo (JP); Masahiko Kami, Tokyo (JP);
Tadanobu Otaki, Tokyo (JP);
Kazutaka Kubota, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 301 days.

(21) Appl. No.: 13/266,382

(22) PCT Filed: Dec. 10, 2009

(86) PCT No.: PCT/JP2009/070699
§ 371 (c)(1),
(2), (4) Date: Oct. 26, 2011

(87) PCT Pub. No.: WO2010/125706
PCT Pub. Date: Nov. 4, 2010

(65) Prior Publication Data
US 2012/0047068 A1 Feb. 23, 2012

(30) Foreign Application Priority Data
Apr. 30, 2009 (JP) ................. 2009-111258

(51) Int. Cl.
*G06Q 40/00* (2012.01)
*G06Q 20/12* (2012.01)
(Continued)

(52) U.S. Cl.
CPC ......... *G06Q 20/123* (2013.01); *G06Q 20/105* (2013.01); *G06Q 30/00* (2013.01);
(Continued)

(58) Field of Classification Search
CPC ......... G06Q 40/00; G06Q 20/22; G06Q 40/02
(Continued)

(56) References Cited

U.S. PATENT DOCUMENTS 5,686,713 A * 11/1997 Rivera ................. G07F 19/203
235/375
7,686,691 B2 * 3/2010 Van Luchene ......... G06Q 30/04
463/29
(Continued)

FOREIGN PATENT DOCUMENTS

CN 101180108 A 5/2008
JP 10-340324 12/1998
(Continued)

OTHER PUBLICATIONS

Elham Ramezani, Mobile Payment, Jun. 2008, E-Business Technology, web, 1-19 (Year: 2008).*
(Continued)

*Primary Examiner* — I Jung Liu
(74) *Attorney, Agent, or Firm* — Howard & Howard Attorneys PLLC

(57) ABSTRACT

A card ID and a consumption amount of virtual money are transmitted from a game terminal as charging-target terminal apparatus, the card ID being recorded in a card possessed by a user (step S31). The server apparatus replaces the card ID with a user ID unique to each user (step S32), and specifies a virtual money account managed by the server apparatus in association with the user ID. When the balance of the account is not less than the consumption amount, the consumption amount is subtracted from the balance of the account, and when the balance is less than the consumption amount, the subtraction of the consumption amount is stopped (step S34). Transaction result information including information indicating whether the subtraction of consump-
(Continued)

tion amount has succeeded is transmitted to the game terminal (3) as a response (steps S35, S36).

14 Claims, 13 Drawing Sheets

(51) Int. Cl.
| | |
|---|---|
| *G06Q 20/10* | (2012.01) |
| *G06Q 30/00* | (2012.01) |
| *G06Q 40/02* | (2012.01) |
| *G06Q 50/34* | (2012.01) |
| *G07F 17/00* | (2006.01) |
| *G07F 17/32* | (2006.01) |

(52) U.S. Cl.
CPC ............. *G06Q 40/00* (2013.01); *G06Q 40/02* (2013.01); *G06Q 50/34* (2013.01); *G07F 17/0014* (2013.01); *G07F 17/3244* (2013.01)

(58) Field of Classification Search
USPC ...................................................... 705/35–45
See application file for complete search history.

(56) References Cited

U.S. PATENT DOCUMENTS

| | | | |
|---|---|---|---|
| 8,452,702 B1* | 5/2013 | O'Donnell ............. | G06Q 40/02 705/35 |
| 2007/0060386 A1 | 3/2007 | Yamagishi et al. | |
| 2007/0082739 A1 | 4/2007 | Tsubota | |
| 2007/0295805 A1* | 12/2007 | Ramachandran ...... | G06Q 40/00 235/379 |
| 2008/0281692 A1 | 11/2008 | Zhang et al. | |
| 2009/0054157 A1 | 2/2009 | Hamilton, II et al. | |
| 2009/0062009 A1 | 3/2009 | Inubushi et al. | |
| 2009/0253517 A1 | 10/2009 | Bererton et al. | |
| 2010/0216545 A1 | 8/2010 | Lange et al. | |
| 2010/0223167 A1 | 9/2010 | Jung et al. | |
| 2011/0081955 A1 | 4/2011 | Lange et al. | |
| 2012/0283024 A1 | 11/2012 | Van Luchene | |

FOREIGN PATENT DOCUMENTS

| | | | |
|---|---|---|---|
| JP | 2003-050957 A | | 2/2003 |
| JP | 2004-303046 A | | 10/2004 |
| JP | 2005-157592 A | | 6/2005 |
| JP | 2006-094877 | | 4/2006 |
| JP | 2007-004266 A | | 1/2007 |
| JP | 2007-079643 | | 3/2007 |
| JP | 2007-130453 | | 5/2007 |
| JP | 2008-257518 | | 10/2008 |
| JP | 2008-305392 | | 12/2008 |
| JP | 2009-045176 A | | 3/2009 |
| KR | 10-2006-0111200 A | | 10/2006 |
| TW | 200709092 A | | 3/2007 |
| TW | 200905599 A | | 2/2009 |

OTHER PUBLICATIONS

International Search Report dated Jan. 19, 2010.
U.S. Office Action (U.S. Appl. No. 13/266,425) (dated Oct. 22, 2012).
Chinese Office Action with English Translation (Serial No. 201080018866.5) (dated Oct. 22, 2012).
Australian Office Action (Serial No. 2009345431) (dated Nov. 9, 2012).
Chinese Office Action with English Translation (Serial No. 200980159002.2) (dated Nov. 30, 2012).
English Translation of Japanese Office Action (drafting date Nov. 25, 2011).
Chinese Decision of Rejection with English Translation (dated Apr. 9, 2013).
Korean Office Action with English Translation (dated Feb. 4, 2013).
Japanese Office Action with English Translation (dated Dec. 13, 2011).
Decision for Rejection (Chinese Patent Application) with English Translation—dated Jan. 9, 2014.
Chinese Office Action with English Translation (dated Aug. 5, 2013).
English Translation and Taiwan Office Action for TW Patent Application 099113682—dated Apr. 30, 2013.
Chinese Office Action with English Translation; dated Jan. 5, 2015.
Examination Report (IN Patent Application No. 8260/CHENP/2011); dated Feb. 27, 2018.

* cited by examiner

CHARGE PAYMENT SYSTEM USING VIRTUAL MONEY

CROSS REFERENCE TO RELATED APPLICATION

This application is a national stage application of PCT/JP2009/070699, filed Dec. 10, 2009, which claims priority to Japanese Patent Application No. 2009-111258, filed Apr. 30, 2009, the disclosures of which are hereby incorporated by reference in their entirety.

TECHNICAL FIELD

The present invention relates to a system where it is possible to pay a charge for service or the like by virtual money.

BACKGROUND ART

In theses days, designed and practiced are various kinds of systems where it is possible to pay a charge for service or a price of product by virtual money which is called electronic money. The field of amusement system is not exception. For example, designed is a charge payment system for amusement facilities where electronic money information such as the balance of electronic money is read out from an IC card which a player owns, and the electronic money information is updated and written into the IC card so that a predetermined play charge is subtracted from the electronic money, and thereby a game play is permitted within a play charge (for example, see Patent Literatures 1 to 3).

Patent Literature 1: JP-A-2008-257518, Patent Literature 2: JP-A-2007-79643, and Patent Literature 3: JP-A-2006-94877

SUMMARY OF INVENTION

Problem to be Solved by the Invention

All of the systems in the mentioned patent literatures 1 to 3 are configured to make a medium such as a card hold the balance of virtual money or information relating to money value in association with the balance. Due to this, when the player does not have the medium, he/she can not use the virtual money. This makes fungibility of the medium scarce. It is troublesome that translating the balance between the media is required at the moment when the media is exchanged. At the moment when the medium is lost, there is a risk that the medium might be abused by someone.

The present invention has an aim of providing a charge payment system where it is possible to pay a charge for using the facility by virtual money by using a medium which does not hold information relating to money value such as balance information.

A charge payment system of the present invention solves the above problems in such a way that the charge payment system comprises: a server apparatus which is connected with a network; a charging-target terminal apparatus which is provided as a terminal apparatus for a charging target to be used by a user, and transmits to the server apparatus via the network, first transmission information including a medium ID unique to each medium, the medium ID recorded in a medium possessed by the user; a terminal apparatus for association which transmits to the server apparatus via the network, second transmission information which requires to associate a user ID unique to each user and the medium ID with each other with specifying the user ID and the medium ID, by following operations of the user; and a terminal apparatus for addition which transmits to the server apparatus via the network, third transmission information including the user ID or the medium ID, and an additional amount of virtual money by following operations of the user, wherein the server apparatus has: a storage device which stores ID association data where the user ID and the medium ID are associated with each other, and account association data where the user ID and an account storing a balance of the virtual money are associated with each other; an ID association management device which updates, in a case that the second transmission information has been transmitted from the terminal apparatus for association, the ID association data so that the user ID and the medium ID which are specified in the second transmission information are associated with each other; a virtual money addition device which specifies, in a case that the third transmission information has been transmitted from the terminal apparatus for addition, either the user ID included in the third transmission information, or the user ID associated with the medium ID included in the third transmission information in the ID association data, specifies a virtual money account associated with the user ID specified by referring to the account association data, and adds the additional amount to a balance of the virtual money account specified; a virtual money consumption device which specifies, in a case that information including the medium ID and a consumption amount of the virtual money is transmitted from the charging-target terminal apparatus as the first transmission information, the user ID associated with the medium ID included in the first transmission information referring to the ID association data, specifies the virtual money account associated with the user ID specified, subtracts the consumption amount from the balance of the virtual money account when the balance is not less than the consumption amount, and stops the subtraction of the consumption amount when the balance is less than the consumption amount; and a transaction result transmission device which transmits to the charging-target terminal apparatus, transaction result information including information indicating whether the subtraction of the consumption amount has succeeded or not.

In the charge payment system of the present invention, if the second transmission information is transmitted from the terminal apparatus for association to the server apparatus, the second transmission information specifying the user ID and the medium ID to associate the use ID with the medium ID, the medium ID is associated with the user ID assigned to a specific user by the ID association management device. Thereby, it is possible to select appropriately the medium ID which should be associated with the user ID unique to each user and set the association between them. When the virtual money is deposited into the account, if the third transmission information is transmitted from the terminal apparatus for addition to the server apparatus, the third transmission information including the user ID or the medium ID, and the additional amount of virtual money, the use ID is specified, and the additional amount is added to the balance of the account corresponding to the user ID specified by the virtual money addition device. In a case that a usage charge of the charging target is paid by virtual money held in the account, if the first transmission information is transmitted from the charging-target terminal apparatus to the server apparatus, the first transmission information including the medium ID and the consumption amount corresponding to the usage of the charging target, specified is the user ID associated with the medium ID included in the first transmission information, and the balance of virtual money account corresponding to the user ID specified is reduced by the consumption amount. However, in a case that the balance of the account is less than the consumption amount, the subtraction is not executed. The transaction result information including information indicating whether the subtraction of consumption amount has succeeded or not, is transmitted from the transaction result transmission device to the charging-target terminal apparatus. Thereby, it is possible to utilize the transaction result information as fodder for making various kinds of determinations, such as a determination whether the usage of a charging target is permitted or not, or a determination of a permitted scope for use.

According to the present invention, information relating to money value such as the balance of the virtual money account is held in the side of the server apparatus, and when the charging target being used, it is enough that the medium ID, not the user ID, and the consumption amount are transmitted from the charging-target terminal apparatus to the server apparatus. Even when the user obtains a new medium ID by obtaining a medium newly, exchanging the media or the like, after setting the association between the medium ID and the user ID, it is possible to use the new medium ID for accessing the existing account to pay the usage charge by virtual money. Therefore, it is possible to enhance the offsettability of medium, and it is not necessary to execute a process such as a transportation of the balance at the moment of exchange of media. At the moment of losing the medium, if the association between the medium ID and the user ID is cancelled, it is possible to reduce the risk of abuse. In the present invention, it is not necessary that the charging-target terminal apparatus, the terminal apparatus for association, and the terminal apparatus for addition are physically separated from each other. For example, included in the present invention is the case that a single terminal apparatus having a computer unit is made function, based on the combination of the computer unit and software, at least two of the charging-target terminal apparatus, the terminal apparatus for association, and the terminal apparatus for addition.

For one embodiment of the present invention, the charging-target terminal apparatus may have a usage management device which controls usage of the charging target based on the transaction result information from the transaction result transmission device. Thereby, it is possible to exclude by the usage management device, the abuse such that the charging target is used in excess of the scope of usage charge paid by virtual money, or the charging target is used even if the payment by virtual money is failed in.

For one embodiment of the charge payment system of the present invention, the serve apparatus may have: a user data storage device which stores user data in association with the medium ID so as to be specified to be used at the charging target; and a user data management device which, in a case that information including the medium ID and the user data has been transmitted as the first transmission information from the charging-target terminal apparatus, stores the user data in association with the medium ID, and, in a case that information including the medium ID and a transmission requirement of user data associated with the medium ID has been transmitted as the first transmission information from the charging-target terminal apparatus, transmits the use data associated with the medium ID to the charging-target terminal apparatus. Thereby, it is possible to transmit the user data associated with the medium ID between the charging-target terminal apparatus and the server apparatus, using the medium. Accordingly, the use data management device can be used in common as a device necessary for the registration of user data to the medium and the server apparatus, the calling of the user data from the server apparatus, and the payment of usage charge by virtual money. Thereby, convenience for the user is improved.

In the above embodiment, the charging-target terminal apparatus may update the user data by reflecting operations of the user when the user uses the charging target. Thereby, the charging-target terminal apparatus functions as not only a terminal apparatus for transmitting and receiving the user data, but also a terminal apparatus for updating the user data depending on the operation by the user.

In addition, the charging-target terminal apparatus may be configured as such a game terminal that permits the user to play a game, and updates play data as the user data by reflecting play contents of the game. Thereby, as the user makes the tame terminal recognize the medium ID, it is possible to pay the play charge of the game by virtual money, and it is possible to register the play data on which the play contents of the user are reflected to the server apparatus, or call the past play data to the game terminal to use the data at posterior games. Furthermore, the game terminal may have a game setting control device which determines based on the transaction result information whether a play charge of the game has been paid or not, and changes a setting of the game depending on the determination result. Thereby, it is possible to change the setting of a game depending on whether the play charge of the game has been paid by virtual money or not. For example, as it is possible to set a smaller amount of charge in a case of paying charge by virtual money compared to a case of paying by real cash, it is possible to provide a small charge of play by, for example, making the unit of play time of the game shorter compared to the unit of play time in a case of paying by the real cash. Moreover, in a case when the charge is paid by virtual money, processes may be provided so that a special stage, a special character or the like is made appear, or a difficulty level is made change. Thereby, it is possible to give a motivation of the usage of virtual money to the user.

For one embodiment of the charge payment system of the present invention, the system may by configured so that an website for the user is established by the server apparatus, the website being available via the internet as the network at the terminal apparatus for association, and information can be exchanged via the website between the terminal apparatus for association and the ID association management device. According to this invention, by the access of a user to the website on the server apparatus from the terminal apparatus for association, it is possible to set the association between the medium ID and the user ID. Accordingly, as the user can utilize as the terminal apparatus for association, a machine having a function for accessing the website such as a personal computer or a portable telephone, it is possible to associate easily the medium ID with the user ID.

A server apparatus of the present invention for a charge payment system is connected via a network with each of a charging-target terminal apparatus, a terminal apparatus for association and a terminal apparatus for addition, the charging-target terminal apparatus being provided as a terminal apparatus for a charging target to be used by a user, and transmitting first transmission information including a medium ID unique to each medium, the medium ID recorded in a medium possessed by the user, the terminal apparatus for association transmitting second transmission information which requires to associate a user ID unique to each user and the medium ID with each other with specifying the user ID and the medium ID, by following operations of the user, and the terminal apparatus for addition transmitting third transmission information including the user ID or the medium ID as well as an additional amount of virtual money by following operations of the user, and the server apparatus has: a storage device which stores ID association data where the user ID and the medium ID are associated with each other, and account association data where the user ID and an account storing a balance of the virtual money are associated with each other; an ID association management device which updates, in a case that the second transmission information has been transmitted from the terminal apparatus for association, the ID association data so that the user ID and the medium ID which are specified in the second transmission information are associated with each other; a virtual money addition device which specifies, in a case that the third transmission information has been transmitted from the terminal apparatus for addition, either the user ID included in the third transmission information, or the user ID associated with the medium ID included in the third transmission information in the ID association data, specifies a virtual money account associated with the user ID specified by referring to the account association data, and adds the additional amount to a balance of the virtual money account specified; a virtual money consumption device which specifies, in a case that information including the medium ID and a consumption amount of the virtual money is transmitted from the charging-target terminal apparatus as the first transmission information, the user ID associated with the medium ID included in the first transmission information referring to the ID association data, specifies the virtual money account associated with the user ID specified, subtracts the consumption amount from the balance of the virtual money account when the balance is not less than the consumption amount, and stops the subtraction of the consumption amount when the balance is less than the consumption amount; and a transaction result transmission device which transmits to the charging-target terminal apparatus, transaction result information including information indicating whether the subtraction of the consumption amount has succeeded or not. According to this server apparatus, by the combination of the server with the charging-target terminal apparatus, the terminal apparatus for association, and the terminal apparatus for addition, it is possible to establish the charge payment system of the present invention.

A computer program of the present invention makes a server apparatus for a charge payment system function, the server apparatus being connected via a network with each of a charging-target terminal apparatus, a terminal apparatus for association and a terminal apparatus for addition, the charging-target terminal apparatus being provided as a terminal apparatus for a charging target to be used by a user, and transmitting first transmission information including a medium ID unique to each medium, the medium ID recorded in a medium possessed by the user, the terminal apparatus for association transmitting second transmission information which requires to associate a user ID unique to each user and the medium ID with each other with specifying the user ID and the medium ID by following operations of the user, and the terminal apparatus for addition transmitting third transmission information including the user ID or the medium ID as well as an additional amount of virtual money by following operations of the user, and the server apparatus having a storage device which stores ID association data where the user ID and the medium ID are associated with each other, and account association data where the user ID and an account storing a balance of the virtual money are associated with each other, and the computer program makes the server apparatus function as: an ID association management device which updates, in a case that the second transmission information has been transmitted from the terminal apparatus for association, the ID association data so that the user ID and the medium ID which are specified in the second transmission information are associated with each other; a virtual money addition device which specifies, in a case that the third transmission information has been transmitted from the terminal apparatus for addition, either the user ID included in the third transmission information, or the user ID associated with the medium ID included in the third transmission information in the ID association data, specifies a virtual money account associated with the user ID specified by referring to the account association data, and adds the additional amount to a balance of the virtual money account specified; a virtual money consumption device which specifies, in a case that information including the medium ID and a consumption amount of the virtual money is transmitted from the charging-target terminal apparatus as the first transmission information, the user ID associated with the medium ID included in the first transmission information referring to the ID association data, specifies the virtual money account associated with the user ID specified, subtracts the consumption amount from the balance of the virtual money account when the balance is not less than the consumption amount, and stops the subtraction of the consumption amount when the balance is less than the consumption amount; and a transaction result transmission device which transmits to the charging-target terminal apparatus, transaction result information including information indicating whether the subtraction of the consumption amount has succeeded or not. When a server apparatus retrieves and executes the computer program of the present invention, it is possible to establish the server apparatus which establishes the charge payment system of the present invention.

Also, with respect to the above mentioned server apparatus and the above mentioned computer program of the present invention, it is not necessary that the charging-target terminal apparatus, the terminal apparatus for association and the terminal apparatus for addition are physically separated from each other. For example, the server apparatus and the computer program of the present invention can be applied to the charge payment system which is configured so as to make a single terminal apparatus having a computer unit function, based on a combination of the computer unit and software, as at least two of the charging-target terminal apparatus, the terminal apparatus for association and the terminal apparatus for addition.

Effects of the Invention

As mentioned above, in the present invention, the information relating to money value such as the balance of virtual money account is held on a side of server apparatus. When the charging target is used, by transmitting the medium ID unique to each medium, not the user ID unique to each user, and the consumption amount from the charging-target terminal apparatus to the server apparatus, the user ID and the account thereof are specified based on the medium ID and the virtual money is consumed. Accordingly, even if the user obtains a new medium ID by obtaining a medium newly, exchanging the media or the like, after setting the association between the medium ID and the user ID, it is possible to use the new medium ID for accessing the existing account to pay the usage charge by virtual money.

DESCRIPTION OF EMBODIMENTS

Figure 1:
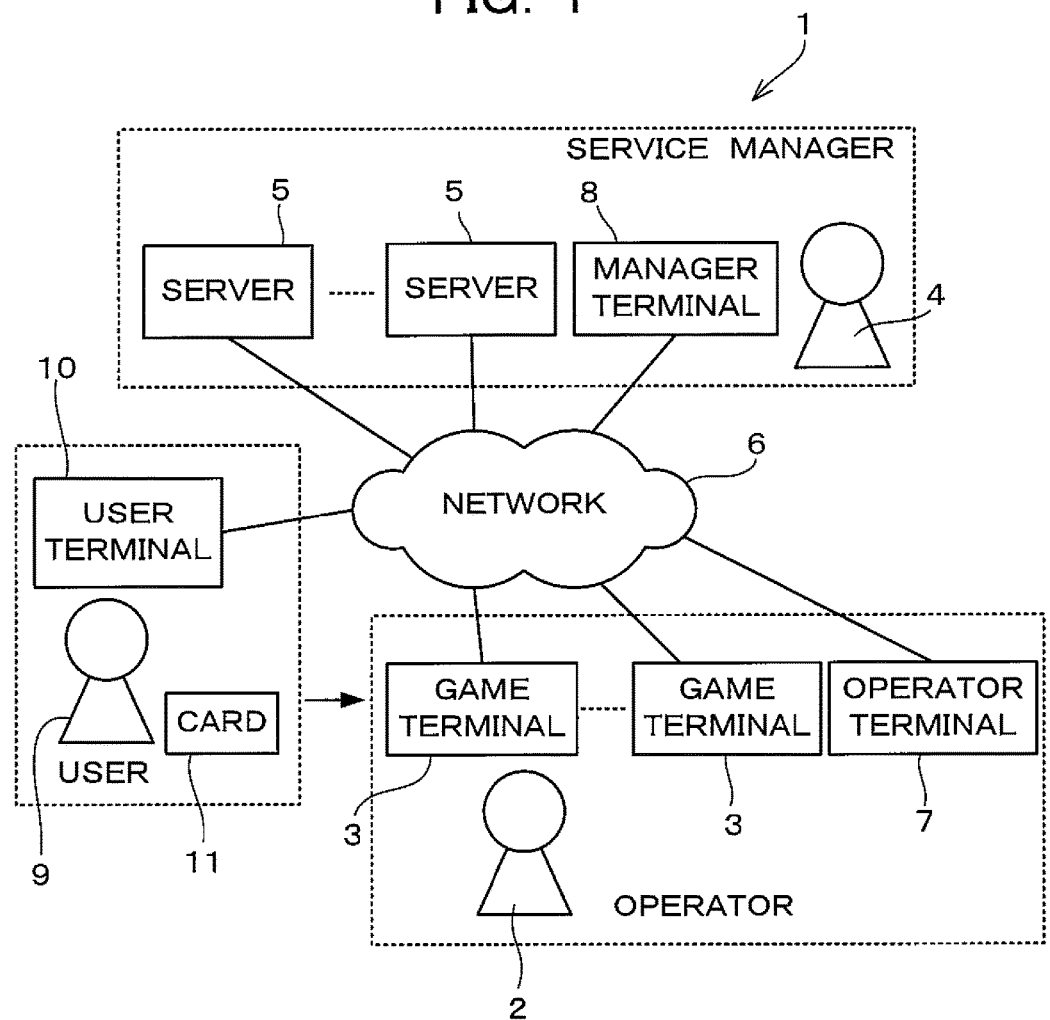
FIG. 1 is a diagram showing a schema of hardware configuration of an amusement system where one embodiment of a charge payment system of the present invention is incorporated.

FIG. 1 shows a schema of a hardware configuration of an amusement system to which a charge payment system according to one embodiment of the present invention is applied. In an amusement system 1 of the present embodiment, one or a plurality of game terminal(s) 3 as a terminal apparatus to be charged and a plurality of server apparatuses (hereinafter referred to as "servers") 5 are connected to be communicated with each other via a network 6 such as the internet or the like, the game terminal 3 being installed in a commercial facility (hereinafter, referred to as a "store") such as an amusement facility by an operator 2, and the servers 5 being managed and operated by a service manager 4. To the network 6, an operator terminal 7 which is used by the operator 2, a manager terminal 8 which is used by the service manager 4, and a user terminal 10 which is used by a user 9 are also connected. The user 9 is a player of a game. The game terminal 3 is a game machine for commercial use where game play is permitted to the user 9 in exchange of a consumption of a predetermined money value. Each of the operator terminal 7 and the manager terminal 8 is preferably a personal computer having a function for a network connection. The user terminal 10 is a user terminal apparatus having a function for a network connection, the user terminal being, for example, a personal computer which is operated by the user 9 (hereinafter, referred to as the "user PC"), a portable terminal such as a portable telephone, or the like. In this embodiment, the user terminal 10 is used as a terminal apparatus for association and a terminal apparatus for addition. However, as will be described later, each of the terminal apparatus for association and the terminal apparatus for addition can be appropriately changed to a terminal apparatus at least capable of communicating with the server 5.

In the amusement system 1 of the present embodiment, the user 9 uses, for example, a card 11 as a medium comprising a information storage device such as an IC chip. In the information storage device of the card 11, a card ID is recorded electronically as a medium ID unique to each card 11. In addition, a card number is recorded at a appropriate portion such as a rear surface of the card 11, the card number being obtained, by decoding the card ID, as alphanumeric characters which the user 9 can recognize. It is possible to encode and decode between the card number and the card ID, and each of them functions as the medium ID. The card 11 is issued by the service manager 4, and delivered from the service manager 4 to the user 9 directly of via an operator. In one example, the card 11 is provided to the user 9 by a card vending machine (not shown), the card vending machine being installed by the operator 2, or the card 11 could be provided to the user 9 by the game terminal 3. A card reader (omitted in FIG. 1) for reading the card ID from the card 11 is attached to the game terminal 3.

In the amusement system 1 of the present invention, included is a system providing various kinds of services to each of the operator 2 and the user 9. For example, in a case that the user 9 makes the game terminal 3 recognize the card ID of the card 11 to play a game, play data including a score of the game and the like is generated in the game terminal 3, and the play data is transmitted to and stored in the server 5 together with the card ID. The play data stored by the server 5 can be used when posterior games are played. For example, in a case that the user 9 plays the same game again, by making the game terminal 3 recognize the card ID of the card 11 before starting the game, it is possible to make the game terminal 3 read out from the server 5 the play data stored in association with the card ID. Alternatively, in a case that a battle game via the network 6 is available at the game terminal 3, provided by the server 5 to the users 9 each having accessed the server 5 within a predetermined time to apply for the battle game is a service that the users 9 as opponents are combined based on the play data stored in association with each of the users 9.

Additionally, the service manager 4 operates a membership user site (a website for users) on the server 5. The user 9 can use the user site by registering a user ID and a user password. The user ID is an ID assigned uniquely to each user 9. The user 9 who did membership registration, he/she can use various kinds of services through the user site. As one of the services, on the user site, provided is a service that the user ID is associated with one or a plurality of card ID(s). The association is sometimes referred to as the connection. By setting the association, it is possible for the server 5 to distinguish the association between the user ID(s) and the play data. Thereby, it is possible to reflect the contents of play data associated with the card ID on the various kinds of services to be provided to the user ID specified on the user site. Moreover, included in the amusement system 1 is a charge payment function which makes it possible that a virtual-coin (virtual money) account is given for each user 9 on the server 5, the user 9 deposits (or replenish) the virtual coin into his/her account, and the amount of virtual coin equal to a charge for usage of the terminal 3 is withdrawn from the account.

Figure 2:
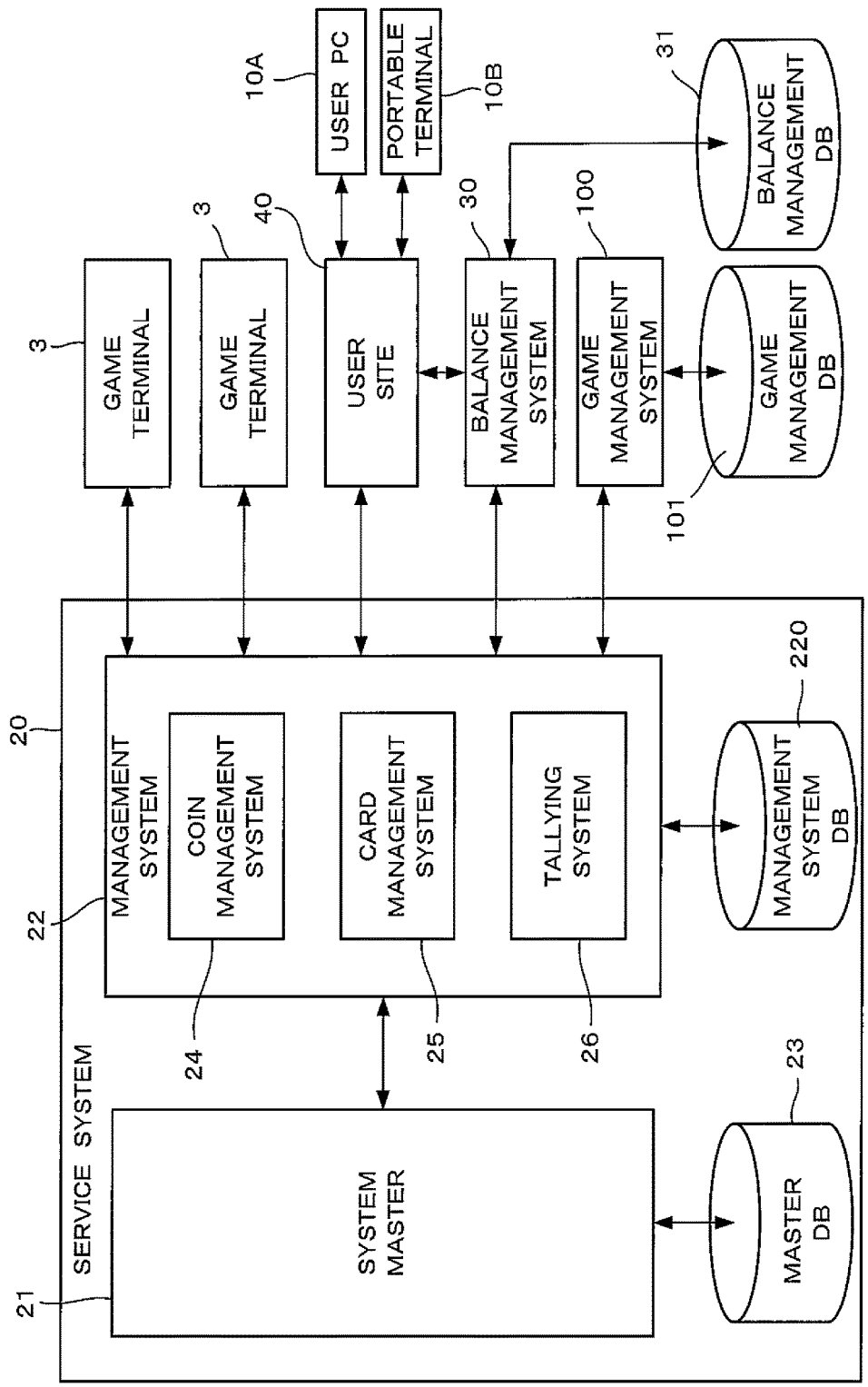
FIG. 2 is a function block diagram showing a configuration of the amusement system shown in FIG. 1.

FIG. 2 shows a block diagram indicting a configuration of a whole of the amusement system 1 which is practiced by a combination of hardware and software. In the amusement system 1, a service system 20, a balance management system 30, and a game management system 100 are established on the server 5 which is managed by the service manager 4. These systems 20, 30, 100 may be established on one specified server 5, or may be spread across plural servers 5 to be established. The service system 20 comprises a system master 21 and a management system 22. The system master 21 manages various kinds of information stored in a master data base 23, or searches the master data base 23 to respond the search result in response to an inquiry from the management system 22.

Figure 3:
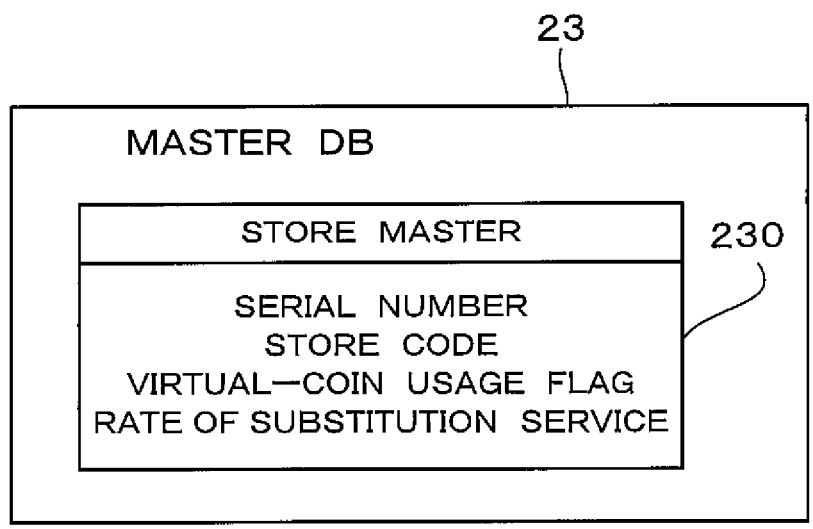
FIG. 3 is a diagram showing one example of data stored in a master database shown in FIG. 2.

In the master data base 23, as one example, stored is a store master 230 which is shown in FIG. 3. The store master 230 is, for example, designed as a data table in which plural records are collected, each record including a serial number, a store code, a virtual-coin usage flag, a rate of substitution service fee and the like. The serial number is a number assigned to each game terminal 3 in an appropriate order (for example, the order that the game terminal 8 was produced). The store code is information by which the operator 2 distinguishes the store which is managed by him/her. A unique number is given to each store code. The virtual-coin usage flag is flag information for determining whether the operator 2 of the store permits to use the virtual coin. The rate of substitution service fee is a rate of service fee in a case that the service manager 4 takes care of collection of usage charge from the user 9.

Returning to FIG. 2, the explanation will be continued. In the management system 22 of the amusement system 1, a coin management system 24, a card management system 25, and a tallying system 26 are included. The coin management system 24 is a system which provides a function of managing usage of virtual coin. The coin management system 24 executes various kinds of processes relating to the consumption of the virtual coin such that the virtual coin is consumed in response to a virtual-coin consumption requirement from the game terminal 3. The card management system 25 is a system which provides various kinds of services using the card 11. The card management system 25 manages information of the card ID and the user ID. The tallying system 26 executes a process for tallying the charge for the usage of game terminal 3 by the virtual coin for each store in units of a predetermined period (e.g. in units of days, or in units of months). The tallying system 26 may tally the usage charge by the virtual coin for each game terminal 3, or for each kind of game executed at the game terminal 3.

Figure 4:
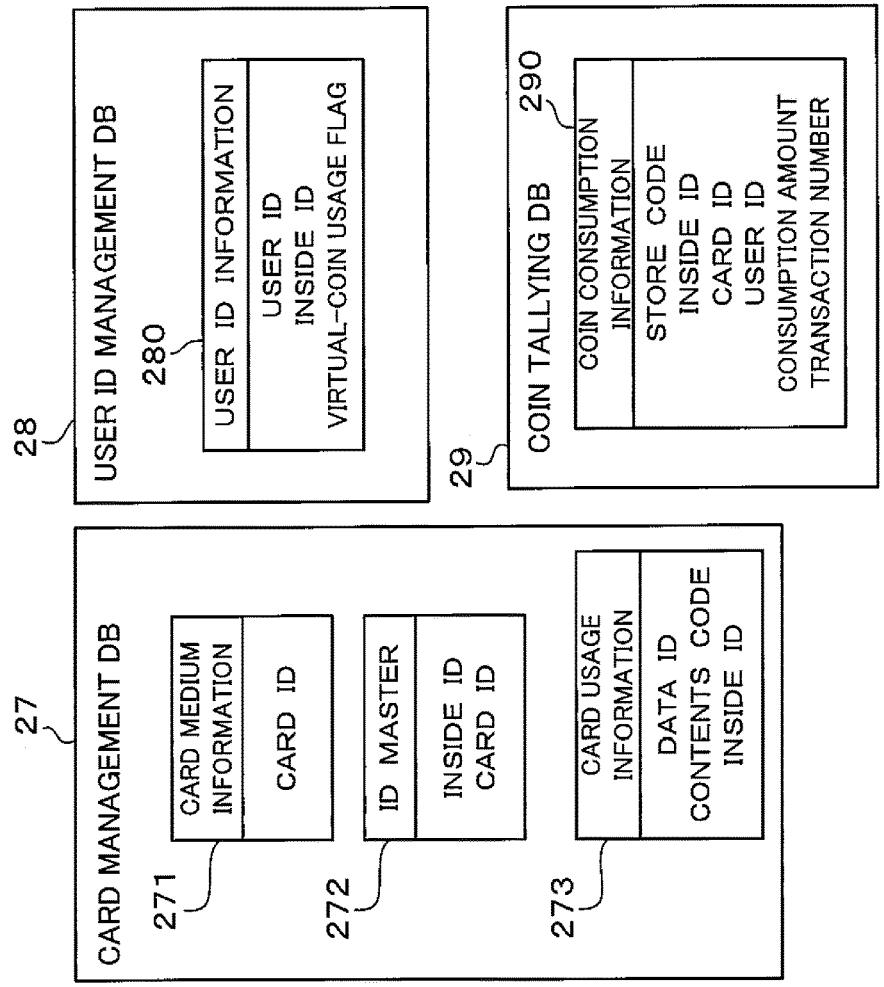
FIG. 4 is a diagram showing one example of data stored in a management system database shown in FIG. 2.

In a management data base 220, as data to be referred to in the systems 24 to 26, there are stored a card management database 27, a user ID management database 28, and a coin tallying database 29 which are shown in FIG. 4. The card management database 27 is structured by collecting data to be required for a management of the card 11. The data includes card medium information 271, an ID master 272, card usage information and the like.

The card medium information 271 is information for managing the card 11, and is structured as a data table in which collected are records, each record including information such as the card ID. The card ID has been mentioned above. The ID master 272 is data for associating various kinds of IDs with each other, the various kinds of IDs being managed in the service system 20. The ID master 272 is structured as a data table in which collected are records, each record including information such as an inside ID and the card ID. The inside ID is information for associating a card ID with a user ID, and is correlated to a card ID one on one. Additionally, it is possible to correlate plural inside IDs to one user ID.

The card usage information 273 is information for managing card usage information of each game terminal 3. The card usage information 273 is structured as a data table in which collected are records, each record including a contents code and the inside ID. The contents code is a code unique to each model for distinguishing a model of the game terminal 3. A unique value is obtained by combining the inside ID and the contents ID. The data ID is a value uniquely given to the combination of the inside ID and the contents code. The data ID is an ID for specifying the play data stored in the game management database 101 (see FIG. 2). That is, in the game management data base 101, the player data, in which play contents when the player 9 plays the game are stored including a game result and the other, is stored as user data with the data ID unique for each piece of the user data. When the card ID and the contents code are transmitted from the game terminal 2, the card management system 25 searches the ID master 272 to specify the inside ID corresponding to the card ID, and specifies the data ID corresponding to the inside ID and the contents code from the card usage information, and gives the data ID specified to the game management system 100 together with the inside ID and the contents code. When accepting this, the game management system 100 executes processes such that the play data transmitted from the game terminal 3 is correlated to the inside ID, the contents code and the data ID, which are obtained from the card management system 25, to be stored or updated. Alternatively, the player data is retrieved and transmitted to the game terminal 3, the player data being stored in association with the inside ID, the contents code and the data ID. By executing these processes, the combination of the card management system 22 and the game management system 100 functions as a user data management device.

In the user ID management data base 28, collected is data required for managing users. User ID information 280 and the like are included there. The user ID information is information for managing the association (the connection) between the user ID and the inside ID. The user ID information 280 is structured as a data table in which collected are records, each record including the user ID, the inside ID and the virtual-coin usage flag. The user can set his/her user ID freely, as long as the user ID is not the same as the other user ID.

The virtual-coin usage flag is flag information for determining whether the virtual-coin is used or not. The virtual-coin usage flag is set to either one of a value indicating available state for use, or a value indicating unavailable state for use, depending on the instruction from the user 9. That is, the virtual-coin usage flag in the user ID information 280 is flag information for determining the intention or selection of the user 9 with respect to whether the user 9 uses the virtual coin.

In the coin tallying database 29, collected are data for managing a consumption history of the virtual coin of the user 9. The coin consumption information 290 is included there. The coin consumption information 290 is information for managing processes which are executed in response to the virtual-coin consumption requirement transmitted from the game terminal 3. The coin consumption information 290 is structured as a data table in which collected are records, each record including the store code, the inside ID, the card ID, the user ID, a consumption amount, and a transaction number. The consumption amount is a value of consumption amount of the virtual coin which is required in one transaction. The transaction number is a number which is issued uniquely to each transaction by the balance management system 30.

Returning to FIG. 2, the explanation will be continued. The balance management system 30 is established as a system different from the service system 20. However, the balance management system 30 may be integrated with the service system 20 to be established as a single system. The balance management system 30 refers to various kinds of information stored in the balance management database 31, and executes various kinds of processes which are required for managing the balance of the virtual-coin account. The balance management system 30 has an interface for communicating with the management system 22 in the service system 20 and an interface for communicating with a user site 40. The user site 40 is a website which provides various kinds of services to the user 9 when the user 9 accesses the user site 40 by using a user PC 10A or a portable terminal 10B as one example of the user terminal (see FIG. 1).

Figure 5:
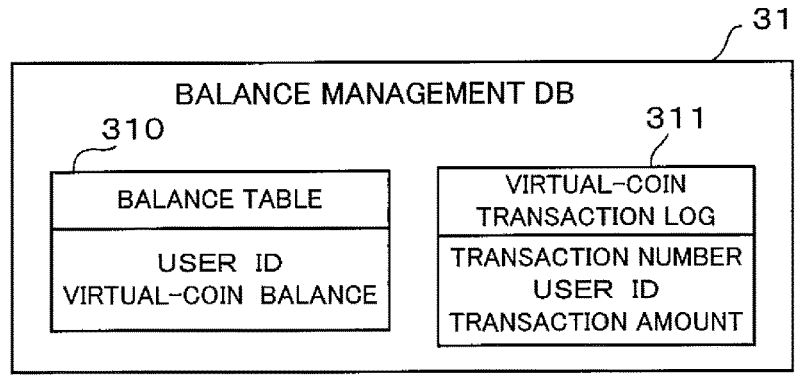
FIG. 5 is a diagram showing one example of data stored in a balance management database shown in FIG. 2.

In the balance management data base 31, a balance table 310 and a virtual-coin transaction log 311 which are shown in FIG. 5 are stored. The balance table 310 is a data table for determining the balance of virtual coin for each user ID. The balance table 310 is structured as collected records, each record including the user ID and the virtual-coin balance. The virtual-coin balance is represented by appropriate units. For example, the virtual-coin balance is represented in such a manner that one coin corresponds to one yen which is a real currency. In a case that plural kinds of virtual coin are available for use, service systems may be individually established for each kind of virtual coin, alternatively, the virtual coin may be managed within a single service system based on a virtual coin ID which is set for distinguishing the kinds of the virtual coin.

The virtual-coin transaction log 311 is log data for recording each transaction of virtual coin in response to the requirement from the user 9. The virtual-coin transaction log 311 is structured as a data table in which collected are records, each record including the transaction number, the user ID, the transaction amount and the like. The transaction number is, as mentioned above, a number which is issued uniquely each time when one transaction with respect to the virtual coin is executed to the balance management system 30. The use ID has been mentioned above. The transaction amount is a value indicating the amount of virtual coin which is replenished or consumed to the balance table 310 by one transaction.

Figure 6:
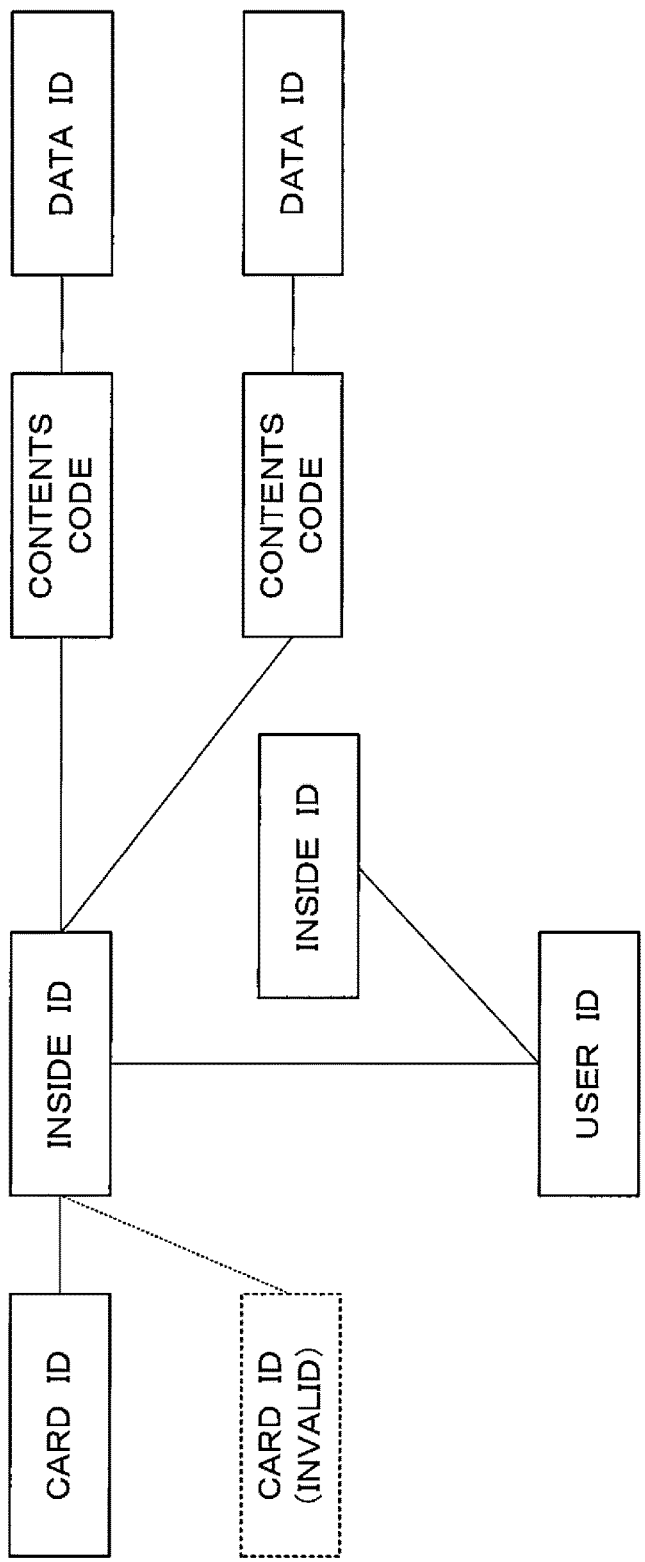
FIG. 6 is a diagram showing relations between a cared ID, an inside ID, a contents code and a data ID which are used in the amusement system.

Next, correlations between above mentioned each of the IDs and codes will be described tidly. FIG. 6 shows relations between the card ID, the inside ID, the contents code and the data ID. The inside ID is assigned in such a manner as to be correlated to the card ID one on one. Plural inside IDs can be correlated to one user ID. Thereby, each card ID is associated with a single user via the inside ID. However, a relation between the inside ID and the card ID is variable. In a case that the card ID associated with the inside ID is varied, the prior card ID is made invalid. On the other hand, it is possible to associate the plural card IDs to the user ID via the plural inside IDs. Plural contents codes can be correlated to one inside ID. One data ID is correlated to one contents code.

Figure 7:
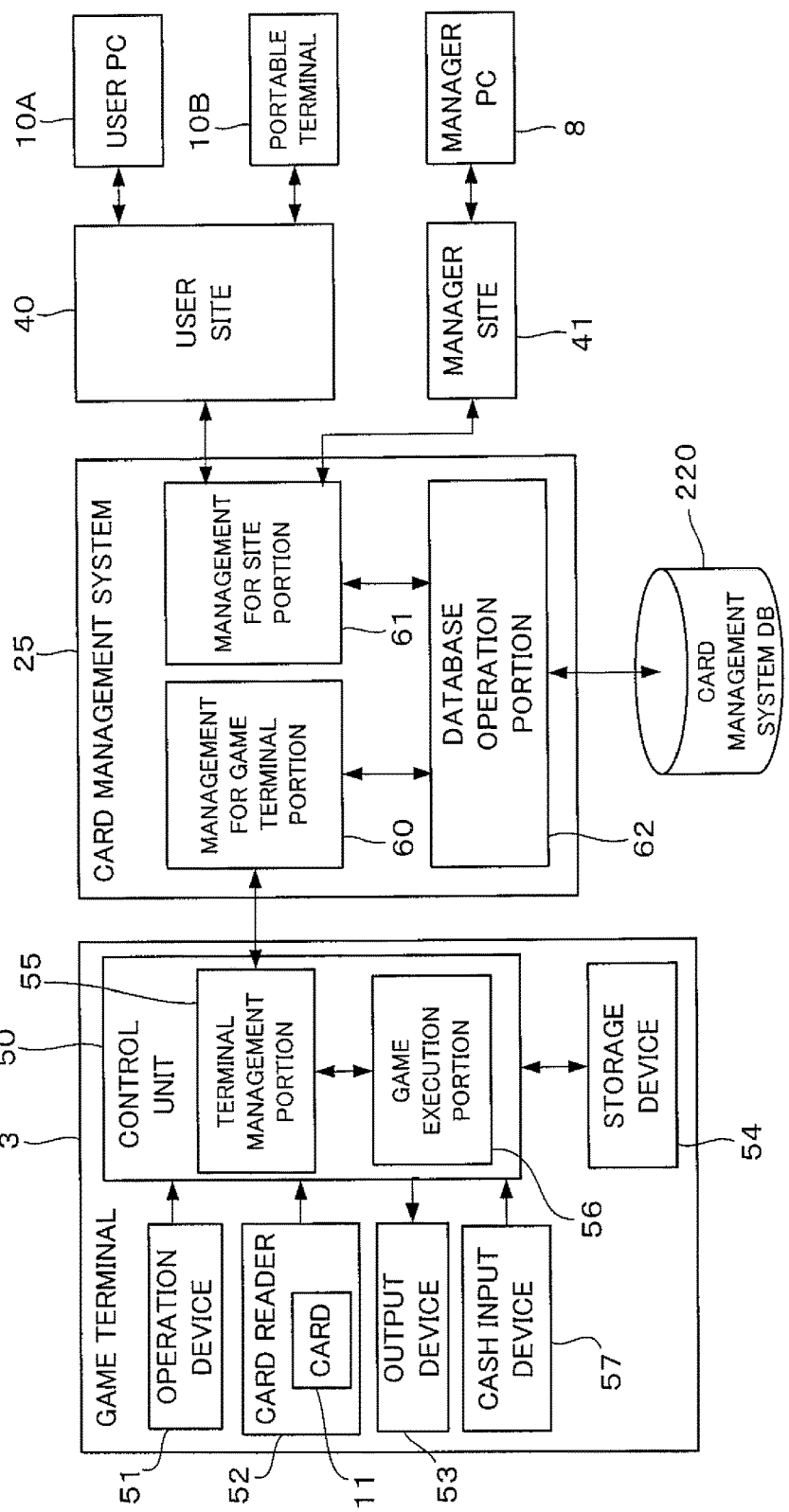
FIG. 7 is a block diagram showing a further specific configuration of a game terminal and a card management system.

FIG. 7 shows a further specific configuration of the game terminal 3 and the card management system 25. In the game terminal 3, a control unit 50 is provided. The control unit 50 is a computer unit having a micro processor as a main body thereof. Connected to the control unit 50 are an operation device 51, a card reader 52, an output device 53 and a storage device 54 such as a hard disk. The operation device 51 is an operation input device which outputs signals in response to the operation contents of the user 9. The card reader 52 retrieves and outputs to the control unit 50 the information stored in a storage medium (e.g. an IC chip) of the card 11. The output device 53 includes a monitor for displaying a game image and the like, a speaker for outputting sound and the like. The storage device 54 stores an operating system for making the control unit 50 function, various kinds of applications to be executed on the operating system, computer programs such as scripts and the like, and data. The control unit 50 retrieves and executes the programs in the storage device 54. Thereby, in the control unit 50, a terminal management portion 55 and a game execution portion 56 are provided as logical devices. The game execution portion 56 controls the progress of a game which is executed in the game terminal 3. The terminal management portion 55 executes controls necessary for the management of the game such as a collection of play charge of the game and a verification of the card 11. A cash input device 57 is further connected to the control unit 50, for a case that the user pays all of or a part of play charge of a game by cash. The cash input device 57 verifies the authenticity of the dropped coins (paper notes may be dropped as well as the coins) by the user 9, and when it is determined that the authenticity of coins are verified, the cash input device 57 outputs to the control unit 50 a signal according to the amount of coins dropped in.

In the card management system 25, a management for game terminal portion 60 and a management for site portion 61, and the database operation portion 62 are provided. The management for game terminal portion 60 is established by a combination of an interface opened to the game terminal 3 and a program which is retrieved via the interface. The management for game terminal 60 manages, for example, various kinds of information relating to the card 11 in response to a requirement from the game terminal 3. The management for site portion 61 is established by a combination of an interface opened to a user site 40 or a manager site 41 and a program which is retrieved via the interface. The management for site portion 61 manages various kinds of services which are provided via the site 40 or 41 to the user 9 or the operator 2. The database management portion 62 searches the management system database 220 in response to an inquiry from the management portion 60 or 61, and returns the result corresponding to the inquiry. The terminal management portion 55 is capable of communicating bilaterally with the coin management system 24 shown in FIG. 2 as well as the card management system 25.

Figure 8:
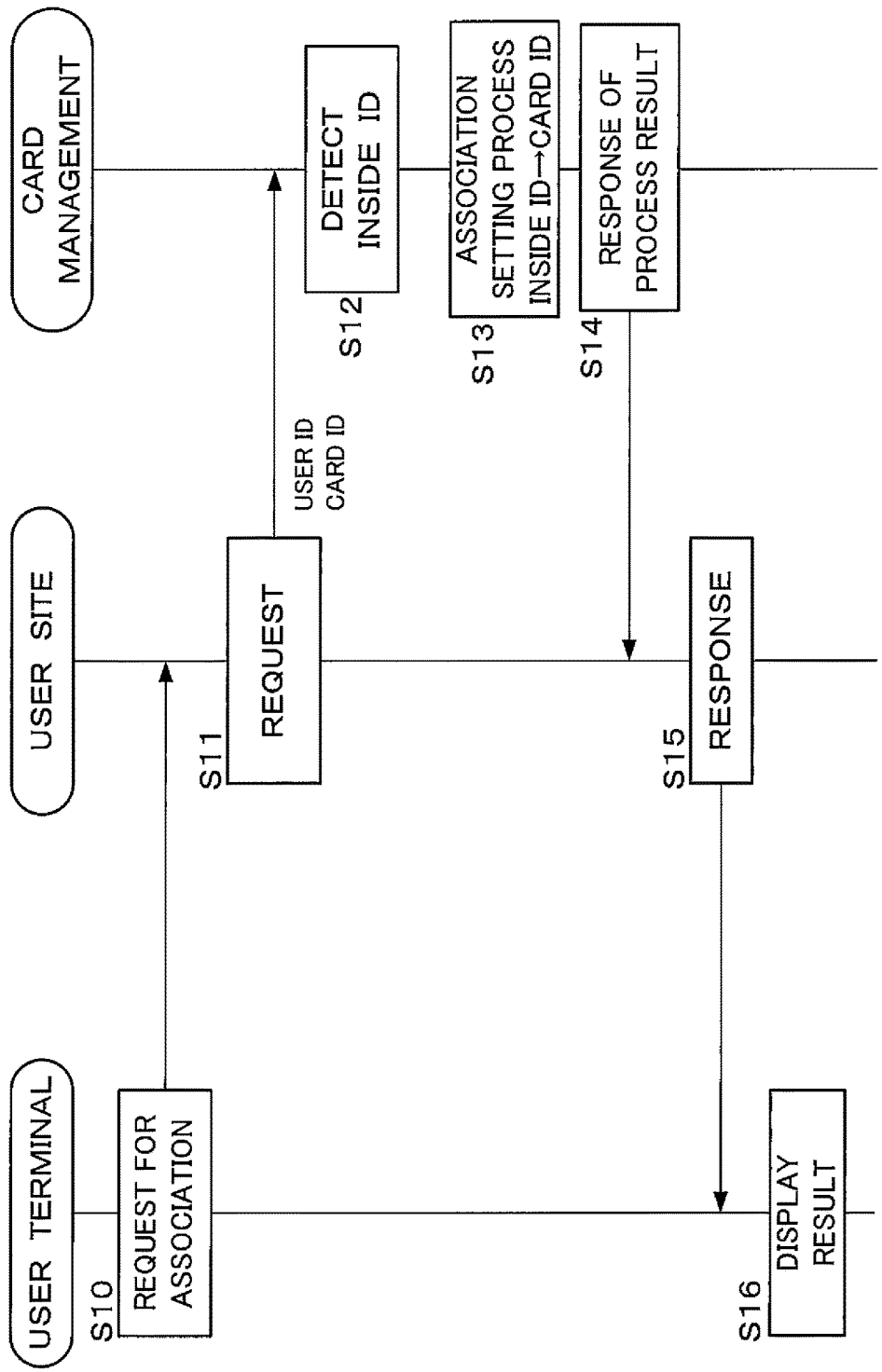
FIG. 8 is a flowchart showing processes executed between the user terminal, the user site and the card management system, when the user sets the association between the card ID and the user ID.

Next, referring to FIGS. 8 to 12, various kinds of processes will be described, the processes relating to the use of virtual coin. FIG. 8 shows processes to be executed when the user 9 sets the association between the card ID and the user ID. In the user site 40, prepared is a web page for setting the association between the user ID and the card ID. The user 9 can login to the web page by inputting the user ID and the user password from a user terminal 10 (as one example, the user PC 10A or the portable terminal 10B). On the web page, the user 9 inputs a card number printed on, for example, a rear surface of the card 11 which should be associated with the user ID, and specifies a new setting of association or a change of association. Thereby, a request of the association is created on the user terminal 10 and transmitted to the user site 40 (step S10).

As mentioned above, the card number is alphanumeric which is obtained by decoding the card ID, and is correlated to the card ID one on one. Namely, when receiving the request of step S10, the user site 40 can obtain, in addition to the user ID which is log-inning to the user site 40, the card ID by encoding the card number. Hereinafter, the card ID which is obtained at this moment is sometimes called the new card ID. The user site 40 requests an association process to the card management system 25 indicating a pair of the user ID obtained from the user terminal 10 and the new card ID (step S11). When receiving the request, the card management system 25 searches the user ID information 280 to obtain the inside ID correlated to the user ID indicated (step S12), and updates a record in the ID master 272 so that the new card ID is associated with the inside ID obtained, or the new card ID is associated with the inside ID invalidating a prior card ID. However, in a case that the inside ID is not found, or a case that setting association is impossible by some reasons, the ID master 272 is not updated. In a case that plural inside IDs are obtained, the new card ID is associated with one of the inside IDs which has been selected by the user 9.

After that, the card management system 25 returns a result of process of step S13 as a response to the user site 40 (step S14). In response to this, the user site 40 returns the result of process as a response to the user terminal 10 (step S15). The use terminal 10 which has received the response displays the result of process on a monitor (step S16).

Figure 9:
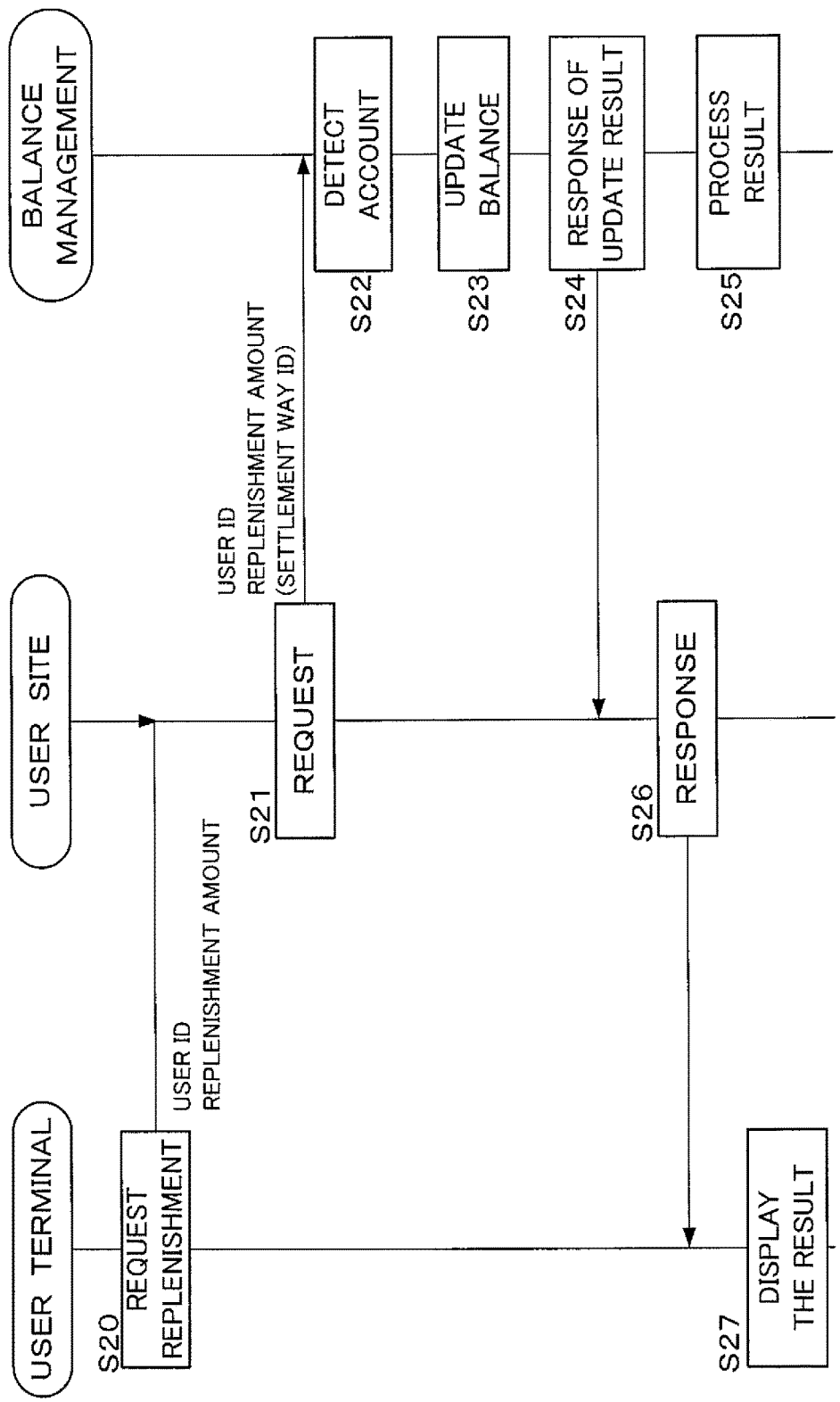
FIG. 9 is a flowchart showing processes executed between the user terminal, the user site and the balance management system, when the user deposits the virtual money to his/her account.

FIG. 9 shows processes at the moment when the user 9 replenishes the virtual coin into his/her account. Replenishing means depositing. These processes are executed between the user terminal ID and the balance management system 30 via the user site 40. Although, in this embodiment, the processes for setting association between the card ID and the user ID and the processes for replenishment of virtual coin are executed at the same user site 40, these processes can be executed separately in different systems via the user site 40, or can be executed separately at different sites. Hereinafter, the explanation will be continued by assuming that these processes are executed at the same user site 40. In the user site 40, established is a web page for managing accounts. The user 9 can login to the web page by inputting the user ID and the user password from the user terminal 10 (as one example, the user PC 10A or the portable terminal 10B). When the user 9, on the web page, inputs the amount of virtual coin to be replenished into his/her account, that is, a replenishment amount (an additional amount) and executes a predetermined replenishment operation, a request is created on the user terminal 10, the request indicating the replenishment of virtual coin, and the request is transmitted to the user site 40 (step S20). In the request, the user ID and the replenishment amount are included. However, in a case that login information has been transmitted to the user site 40 before the process of step S20 is executed, as the user site 40 has already obtained the user ID, only the replenishment amount may be transmitted at step S20.

At the user site 40 which has received the request for replenishment, generated and transmitted is the replenishment request to the balance management system 30 (step S21). In this request, the user ID and the replenishment amount are included. A settlement way ID may be further included. The virtual coin ID is, as mentioned above, an ID to be used in the system for distinguishing the kinds of virtual coin. The settlement way ID is information for distinguishing settlement ways at the moment when a real cash is required to the user 9 in exchange of the replenishment amount of virtual coin. Namely, in a case that the user 9 can pay the purchase price of virtual coin by cash, credit card, web money (the trade mark) and the like, the settlement way ID is necessary for distinguishing the settlement way. The user 9 may be permitted to select the settlement way on the use site 40, and the settlement way ID corresponding to the selection result may be given to the balance management system 30. The settlement way ID may be registered in the balance management database or the like in association with the user ID in advance. In this case, it is not necessary to include the settlement way ID at step S21.

When receiving the request of step S21, the balance management system 30 accesses the balance table 310 to detect the record corresponding to the user ID (step S22). Subsequently, the balance management system 30 updates the balance table 310 so that the replenishment amount is added to the balance of the account (step S23), and generates and returns to the user site 40 a response indicating the update result (step S24). Moreover, the balance management system 30 records the result of update process of the account in the virtual-coin transaction log 311. When receiving the response of step S24, the user site 40 generates and transmits to the user terminal 10 a response of the result of updating balance (step S26), and the user terminal 10 receives the response and displays the replenishment result (step S27). In a case that the account is not found, or it is impossible to update the balance by some reasons, the record in the balance table 310 is not updated and information, such as a code indicating that the replenishment is impossible, is appropriately returned as the response.

Figure 10:
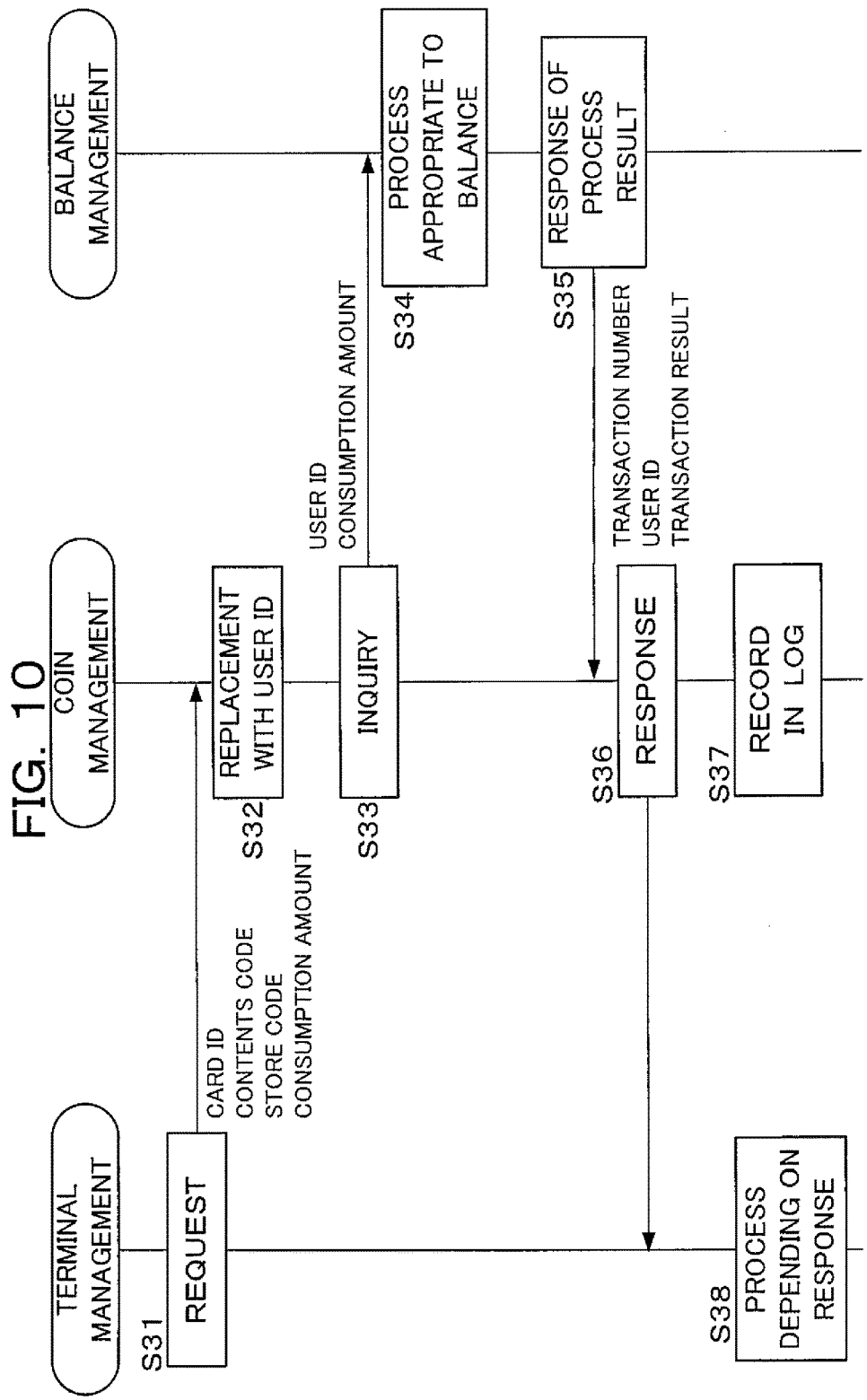
FIG. 10 is a flowchart showing processes executed between the game terminal, the coin management system and the balance management system, when the user pays a play charge of a game by virtual money.

FIG. 10 shows processes which are executed at the moment when the user 9 pays the play charge of the game terminal 3 by virtual coin. These processes are executed between the terminal management portion 55 of the game terminal 3 and the balance management system 30 via the coin management system 24. When the user 9 makes the card reader 52 recognize the card ID of the card 11, a request for asking for the consumption of play charge is generated and transmitted to the coin management system 24 at the terminal management portion 55 (step S31). This request includes the card ID, the contents code, the store code and the consumption amount. The card ID is a value obtained bye the card reader 52. The contents code and the store code have been set for each game terminal 3 and stored in the storage device 54 thereof in advance. The consumption amount may be specified by the user, or may be a value which is set as the minimum value necessary for playing the game and stored in the storage device 54 by the operator 2.

When receiving the request of step S31, the coin management system 24 replaces the card ID included in the request with the user ID (step S32). In this process, first, the coin management system 24 obtains the inside ID corresponding to the card ID by searching the ID master 27 of the card management database 27. Subsequently, the coin management system 24 obtains the user ID corresponding to the inside ID by searching the user ID information 280 in the user ID management database 28. In a case that extracted is the record corresponding to the inside ID by searching the user ID information 280, the value of the virtual-coin usage flag in the record is also distinguished. In a case that the virtual-coin usage flag shows at this stage a value indicating that the usage is prohibited, the processes after step S32 are cancelled and a response indicating that the usage is prohibited is returned to the terminal management portion 55. Moreover, in a case that a value of virtual-coin usage flag of a record corresponding to the store code is inquired, the record in the store master 230 of the master database 23, and the returned result shows the value indicating that the usage is prohibited, in the same way as the earlier case, a response indicating that the usage is prohibited may be returned to the terminal management portion 55.

When the replacement with the user ID at step S32 has succeeded, the coin management system 24 inquires the balance of virtual coin at the balance management system 30 (step S33). This inquiry includes the user ID and the consumption amount. When receiving the inquiry, the balance management system 30 extracts the record corresponding to the user ID by searching the balance table 310 of the balance management database 31, obtains virtual-coin balance stored in the record, and executes a process appropriate to the balance (step S34). In this case, if the balance is not less than the consumption amount, the record is updated so that the consumption amount is withdrawn from the balance. If the balance is less than the consumption amount, the update is stopped.

Subsequently, the balance management system 30 creates returns to the coin management system 24 a response depending on the result of the process of step S34 (step S35). The response in this case includes the transaction number issued from the balance management system 30 for each transaction, the user ID, and a transaction result indicating whether the withdrawal of the consumption amount has succeeded or not. When receiving the response from the balance management system 30, the coin management system 24 creates a response depending on whether the withdrawal has succeeded or not and returns the response to the terminal management portion 55 of the game terminal 3 (step S36). Subsequently, the coin management system 24 records in the virtual-coin transaction log 311, the user ID and the consumption amount included in the request from the terminal management portion 55, the transaction number and the transaction result included in the response from the balance management system 30 and the like (step S37). When receiving the response from the coin management system 24, the terminal management portion 55 executes a process depending on the response (step S38). For example, in a case that the play charge is withdrawn successfully from the account, the terminal management portion 55 subsequently executes a process to be executed after the payment of play charge, and in a case that the withdrawal has not succeeded, the terminal management portion 55 executes a process for requiring to pay the play charge by real cash.

Figure 11:
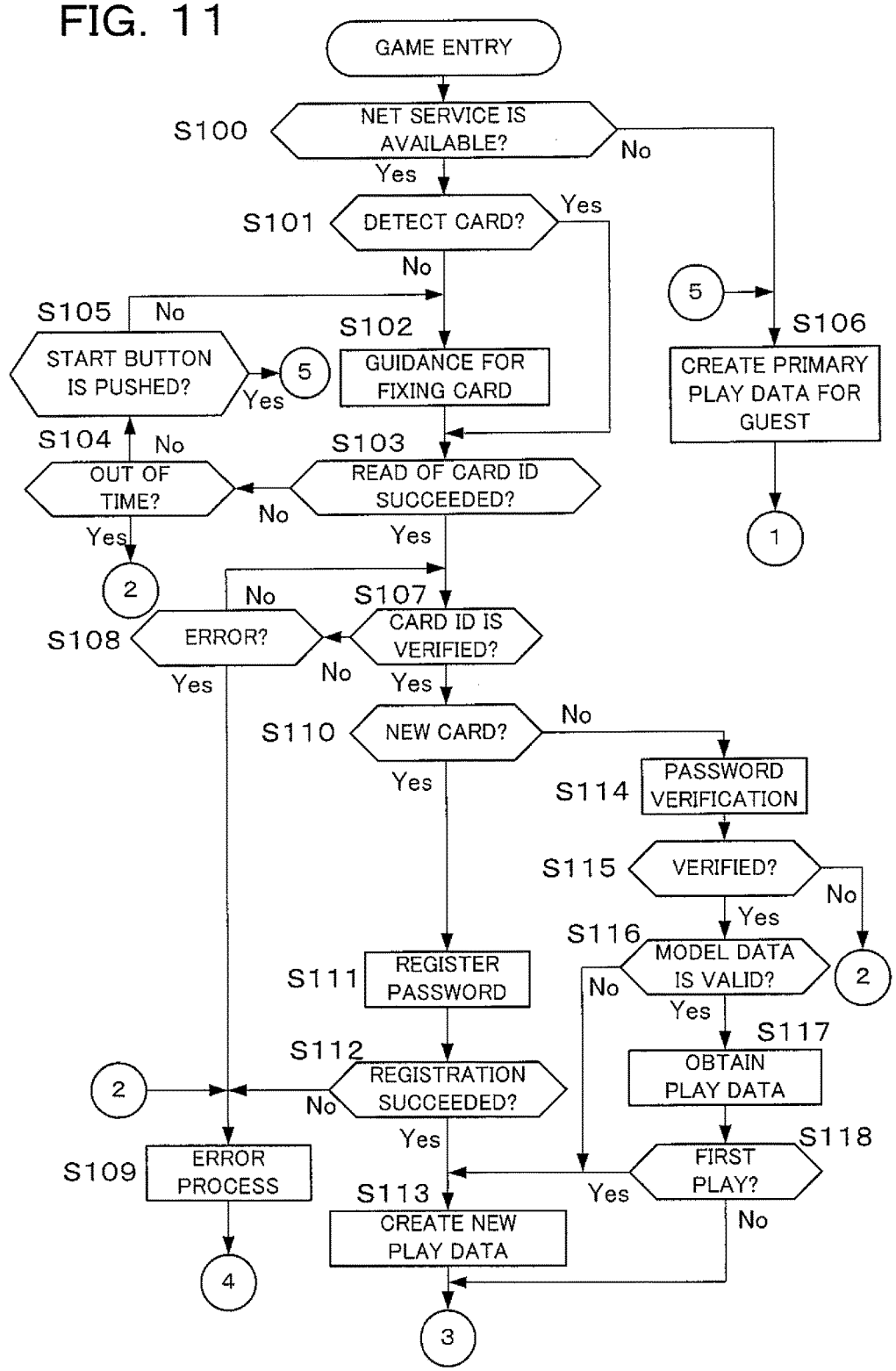
FIG. 11 is a flowchart showing a game entry process which is executed by the control unit of the game terminal, when the user enters a game.
Figure 12:
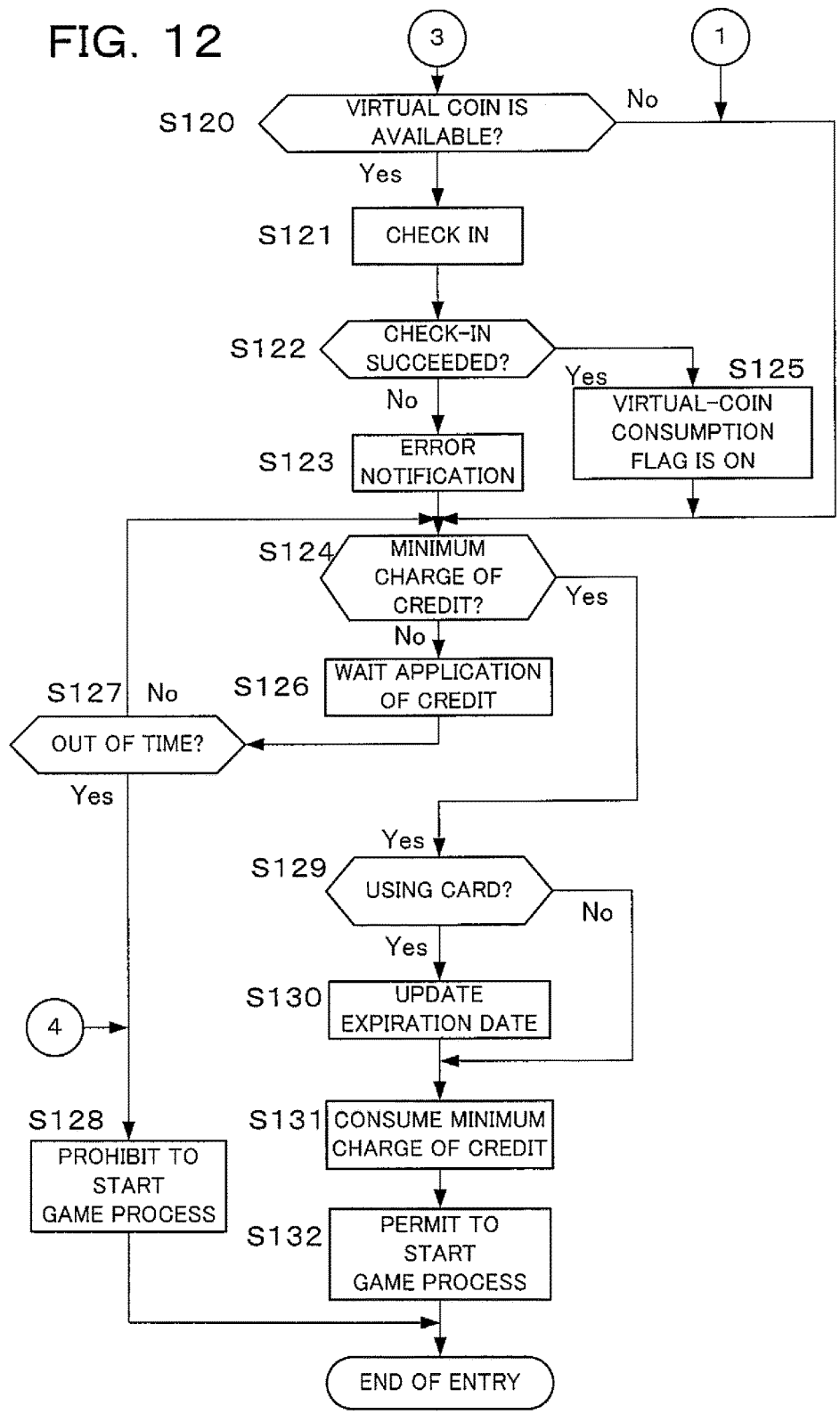
FIG. 12 is a flowchart following FIG. 11.

FIGS. 11 and 12 shows a game entry process which is, at the moment when the user 9 plays a game using the game terminal 3, executed as the preparation thereof by the terminal management portion 55 of the control unit 50 in the game terminal 3. The terminal management portion 55 in the game terminal 3 regularly monitors outputs from the operation device 51 and the card reader 52, and when based on the outputs, determines that a predetermined entry condition has been satisfied, starts the process shown in FIG. 11. For example, it is determined that the entry condition is satisfied in the following cases. As case that the insert operation or the touch operation of the card 11 to the card reader 52 has been detected. A case that it has been detected coins (real cash) not less than a predetermined amount were dropped-in. A case that a game start operation to the operation device 51 (as one example, a push down operation of a start button) has been detected in a state that the play charge not less than a predetermined amount is deposited to the game terminal 3.

When starting the game entry process, the terminal management portion 55 first inquires at step S100, at the card management system 25 whether the service system 20 is available or not. When receiving an answer indicating that the service system 20 is available, the terminal management portion 55 advances to step S101 to determine whether the card reader 52 has detected the card 11 or not. In a case that the card 11 is not detected, the terminal management portion 55 advances to step S102 to display on the monitor an image where fixing the card 11 is prompted, and subsequently as step S103, the terminal management portion 55 determines whether the card ID has been read out successfully. In a case that the read out has not succeeded, the terminal management portion 55 advances to step S104 to determine whether the situation is out of time, that is, whether a predetermined waiting time has been elapsed after the prompt of fixing the card 11 is started. In a case that the situation is not out of time, the terminal management portion 55 advances to step S105 to determine whether the start button has been pushed down or not. In a case that the start button has been pushed down, the terminal management portion 55 advances to step S106, in a case that the start button has not been pushed down, the terminal management portion 55 returns to step S102. In a case that the card 11 has been detected at step S101, the terminal management portion 55 advances to step S103 to determine whether the card ID has been read out successfully. In a case that the service system 20 is unavailable at step S100, the terminal management portion 55 advances to step S106 to create primary play data for guest and stores the data in an inside storage device (such as RAM) of the control unit 50.

At step S103, in a case that it is determined that the card ID has been read out successfully, the terminate management portion 55 advances to step S107 to require the card management system 25 to verify the card ID. With respect to the verification at step S107, in a case that a response indicating that the card ID has been verified is not obtained from the card management system 25, the terminal management portion 55 advances to step S108 to determine whether some errors has occurred. In a case that the terminal management portion 55 has not obtained the response while waiting a predetermined time, or a case that the terminal management portion 55 has obtained a response indicting the card ID was not verified, the terminal management portion 55 determines an error has occurred and advances to step S109 to execute a predetermined error process. In a case that it is not determined that an error has occurred, the terminal management portion 55 returns to step S107. Also, in a case that it is determined that the situation is out of time at step S104, the terminal management portion 55 advances to step S109.

In a case that the card ID has been verified at step S107, the terminal management portion 55 advances to step S110, and determines whether the card 11 is a new card or not. The new card is a card having a card ID which is not associated with the inside IDs in the ID master 272 of the card management database 27. It can be confirmed by inquiring at the card management system 25 whether the card 11 is a new card or not. For example, it can be determined by including the confirmation in the inquiry of step S107. When determining that the card 11 is a new card at step S110, the terminal management portion 55 advances to step S111 to execute a password registration process.

In the password registration process is a process of requiring the user 9 to input a card password, that is, a password to be associated with the card ID from the operation device 51 of the game terminal 3, and when the password being inputted, transmitting the password to the card management system 25 to register the password in a state of associating with the card ID. After the password registration process, the terminal management portion 55 advances to step S112 to wait a predetermined time for a response from the card management system 25 and determine whether the password registration has been completed successfully, that is, the password inputted by the user 9 has been registered. In a case that it is not determined that the registration has succeeded (the case that the response cannot be obtained is also included), the terminal management portion 55 advances to step S109 to execute an error process. On the other hand, in a case that the registration has succeeded, the terminal management portion 55 advances to step S113 to create new play data and store the data in the inside storage device of the control unit 50. Additionally, the play data created is transmitted to the server 5 at an appropriate timing, for example, at the timing of game end, and stored in the game management database 101 in association with the inside ID, the contents code and the data ID.

At step S110, in a case that it is determined that the card 11 is not a new card, that is, that the card 11 is a card which has been already registered in association with the inside ID in the ID master 272, the terminal management portion 55 advances to step S114 to execute a password verification process. The password verification process is a process of requiring the user 9 to input the password which has been already registered in association with the card 11 from the operation device 51 of the game terminal 3, transmitting the password to the card management system 25 when the password being inputted, for checking the password transmitted against the password registered in association with the card ID. After the password verification process, the terminal management portion 55 advances to step S115 to wait a predetermined time for a response from the card management system 25 and determine whether the password verification has succeeded, that is, whether it has been verified that the password inputted by the user 9 is consistent with the password already registered. In a case that it is not determined that the verification has succeeded (the case that the response can not be obtained is also included), the terminal management portion 55 advances to step S109 to execute an error process. On the other hand, in a case that the verification has succeeded, the terminal management portion 55 advances to step S116 to determine whether model data is valid by inquiring at the card management system 25. For example, the card ID and the contents code are transmitted from the terminal management portion 55, the card management system 25 obtains from ID master 272 the inside ID corresponding to the card ID, and obtains from the card usage information 273 the contents code corresponding to the inside ID. The card management system 25 determines whether the contents code obtained is consistent with the contents code transmitted from the tame terminal 3, and returns a response to the terminal management portion 55. When consistent, it is determined that the model data is valid.

In a case that it is determined that the model data is invalid at step S116, as the play data corresponding to the card ID does not exist, the terminal management portion 55 advances to step S113. On the other hand, in a case that the model data is valid at step S116, the terminal management portion 55 advances to step S117 to require the server 5 to transmit the play data which is stored in association with the card ID and the contents code, obtain the play data as a response of the requirement, the play data transmitted from the game management system 100, and store the play data in the inside storage device of the control unit 50. Subsequently, at step S118, the terminal management portion 55 determines whether the play is the first one by referring to the play data obtained. In a case that information indicating the play result such as a play score has not yet existed even if the play data is created, it is determined that the play is the first one. In this case, the terminal management portion 55 advances to step S113.

In a case that the new play data is created at step S113 or in case that it is determined that the play is not the first one at step S118, the terminal management portion 55 advances to step S120 shown in FIG. 12. At step S120, the terminal management portion 55 determines whether the virtual coin is available for use at the game terminal 3. For example, the operator sets for each game terminal 31 whether the use of virtual coin is permitted, and the result thereof can be stored in the storage device 54. By referring to the information stored, in a case that it is set that the virtual coin is available, an affirmative determination is obtained at step S120. In a case that the virtual coin is available, the terminal management portion 55 advances to step S121 to require the coin management system 24 to execute a check-in. The check-in is a process corresponding to step S31 in FIG. 10 in which the card ID, the contents code, the consumption amount and the like are transmitted to the coin management system 24 and it is inquired whether the virtual coin is available.

Subsequently, at step S122, the terminal management portion 55 determines whether the check-in has succeeded. For example, it is determined whether the check-in has succeeded or not by referring to the response from the coin management system 24 (step S36 in FIG. 10). In a case that returned is the response indicating that the withdrawal is impossible because of short of balance, or a case that there is no response even if the terminal management portion 55 waits a predetermined time for the response, it is determined that the check-in has not succeeded. Further, in a case that, when it is determined that the virtual-coin usage flag indicates a value that the usage is prohibited at step S32 in FIG. 10 and the response thereof is returned, it is also determined that the check-in has not succeeded. In a case that it is determined that the check-in has not succeeded, the terminal management portion 55 advances to step S123 to inform the user 9 of the error by using the monitor or the like of the game terminal 3. Subsequently, in step S124, the terminal management portion 55 determines whether the minimum charge or credit exists or not. The minimum charge is the minimum amount of charge for necessary for playing a game on the game terminal 3. The minimum charge can be changed appropriately by the operator 2. The information for distinguishing the value set as the minimum charge is stored in the storage device 54 in the game terminal 3. The credit of the present embodiment means play value which is given to the game terminal 3 by the user 9 as value of game play. Also, after the process of step S106, the terminal management portion 55 advances to step S124.

Also, in a case that it is determined that the virtual coin is unavailable state for use at step S120, the process of step S124 is executed. In a case that it is determined that the check-in has succeeded at step S122, after the virtual-coin consumption flag is set to an on state indicating that the play charge was paid by virtual coin, the process advances to step S124. In a case that the check-in has succeeded, the amount which was withdrawn from the virtual-coin account (the consumption amount in FIG. 10) is stored as a credit. Accordingly, when the consumption amount is not less than the minimum charge, an affirmative determination is obtained at step S124. In a case that the consumption amount is less than the minimum charge, a case that the virtual coin is unavailable, or a case that the check-in has not succeeded, a negative determination is obtained at step S124. The kind of real coin which is permitted to be dropped in the game terminal 3 is limited to a coin the value amount unit of which is not less than a certain value amount (e.g. 100 yen), and by the limitation of the coin the unit of play charge of one time is also limited. However, it is possible to pay the play charge by virtual coin using a value amount unit (e.g. 10 yen) smaller than the unit of the coin the game terminal 3 can accept. Therefore, in a case that the virtual coin consumption flag is on, the minimum charge of step S124 may be set lower than a case that the play charge is paid by real coin.

In a case that it is determined that the credit is short to the minimum charge at step S124, the terminal management portion 55 advances to step S126 to require the user 9 to drop coins equal to the shortage amount through the cash input device 57 of the game terminal 3 as the credit in order to apply the coins toward the shortage amount to the minimum charge, and to wait the application of credit. Subsequently, at step S127, the terminal management portion 55 determines whether the situation is out of time, that is, whether a predetermined time has been elapsed after the requirement of applying the credit. When the situation is not out of time, the terminal management portion 55 returns to step S124. In a case of out of time, the terminal management portion 55 advances to step S128, and stops the start of following game process to end the entry process. In this case, in a case that the credit from the virtual coin remains in the game terminal 3, it may be required to refund the remaining amount to the coin management system 24. In a case that the process of step S109 in FIG. 11 has been executed, after that, the process advances to step S128.

In case that the credit is enough for the minimum charge at step S124 (included are a case of applying the credit toward the minimum charge from the virtual coin, and a case of applying real cash toward the shortage amount.), the terminal management portion 55 advances to step S129 to determine whether the card 11 is being used or not. For example, it may be determined that the card 11 is being used at step S129, in a case that an affirmative determination is obtained at either step S112 or step 115 in FIG. 11. In a case that that the card 11 is being used at step S129, the terminal management portion 55 advances to step S130 to require the card management system 25 to update the expiration date of the card ID. In a case that the card 11 is not being used, the terminal management portion 55 skips the process of step S130 and advances to step S131. After the process of step S130, the terminal management portion 55 advances to step S131 to consume the minimum charge of credit. Subsequently at step S132, the terminal management portion 55 permits to start the game process. After that, the terminal management portion 55 ends the entry process. In a case that the start of game process is permitted by the entry process, process is taken over by the game execution portion 56 of the control unit 50, and the game process for making the user 9 play a game is started. The contents of the game process may be set appropriately depending on the kind of game. On the other hand, in a case that the start of game process is prohibited by the entry process, the game process to be executed by the game execution portion 56 is not started.

As explained above, in the amusement system 1 of the present embodiment, the user 9 can pay the play charge of game by virtual coin, by making the game terminal 3 recognize the card ID given to the card 11 the user 9 possesses. The virtual coin account is associated with the user ID unique to each user 9 one-on-one, and it is possible to associate the user ID to plural card IDs. Thereby, even if a card 11 is exchanged, or a card 11 is added, if an association between a card ID (a card number) of a new card 11 and a user ID is set, it is possible to pay the play charge using the virtual-coin account which has been opened since before. For example, in a case that it is possible to obtain a card 11 at a facility where the game terminal 3 is installed, if the user 9 accesses the user site 40 from a portable terminal such as a portable phone at the facility and sets the association between the card number given to the card 11 and the user ID, the user 9 can pay the play charge by virtual coin using the new card 11 to play a game. Accordingly, the offsettability is enhanced with respect to the card 11, and the convenience for the user 9 is enhanced. Additionally, in a case that the user 9 has lost the card 11, if the association between the card ID of the card 11 and the user ID is cancelled, after that, it is impossible to consume the virtual coin from the account even if the card ID is recognized by the card reader 52. Accordingly, compared to a case that the balance of virtual coin is recorded in a medium such as a card, a risk of abuse is reduced.

In the amusement system of the present embodiment, the control unit 50 of the game terminal 3 is capable of determining whether the play charge of the game has been paid by virtual coin or not. Because of this, in a case of using the virtual coin, if processes in a game are changed compared to a case of not-using the virtual coin, it is possible to give a motivation for use of the virtual coin to the user 9. For example, as mentioned above, in a case that the play charge is paid by virtual coin, the charge can be set using a unit of smaller value amount, compared to a case of paying by real cash. Accordingly, it is possible to provide a process such that the minimum charge (refer to step S124 in FIG. 12) is made lower by shortening play time for one time. Moreover, the setting of game may be changed depending on whether the virtual coin is being used or not in such a way that a game difficulty is changed in a case that the play charge has been paid by virtual coin, or a play situation which appears only in a case of using the virtual coin is prepared, the play situation including an operation object such as a character, and a stage. In the process shown in FIG. 12, as the virtual-coin consumption flag is set to the ON state at step S125 in a case that the play charge is paid by virtual coin, by referring to the state of the flag, it is possible to determine whether the play charge has been paid by the control unit 50. Accordingly, for example, it is possible to change the setting of a game, by executing the game setting process shown in FIG. 13 by the terminal management portion 55 or the game execution portion 56 of the control unit 50.

Figure 13:
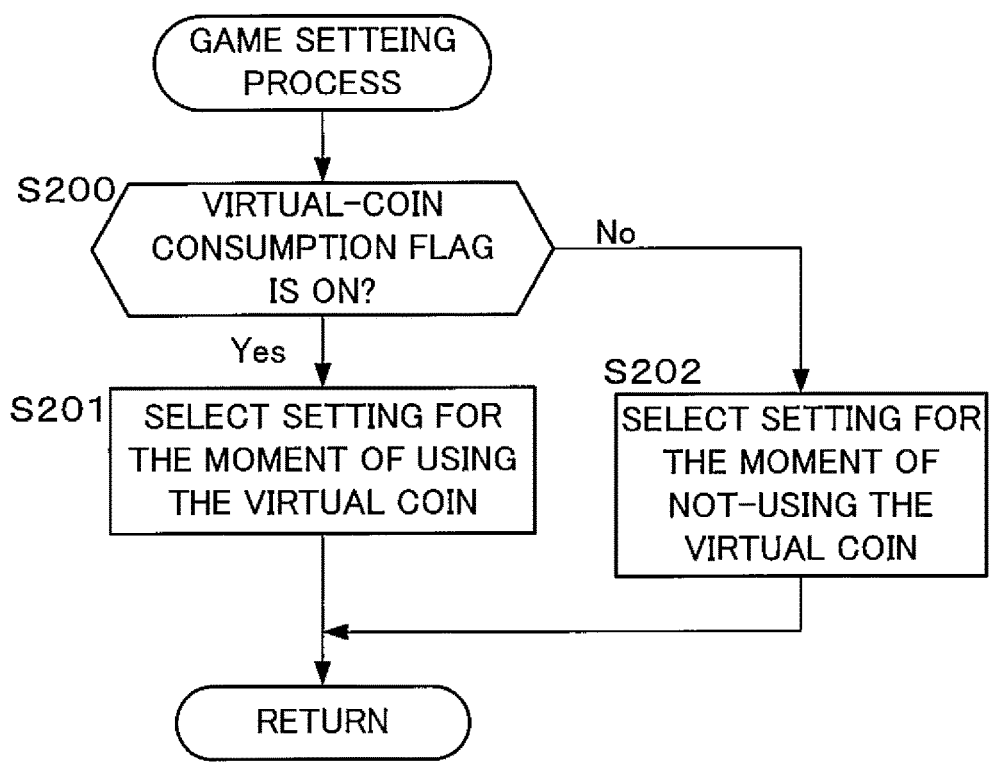
FIG. 13 is a flowchart showing a game setting process which is executed by the control unit of the game terminal for changing the setting of a game depending on whether the virtual money has been used or not.

In the game setting process shown in FIG. 13, first, the control unit 50 determines at step S200 whether the virtual-coin consumption flag in the state of ON or not. In the case of the state of ON, the setting for the moment of using the virtual coin is selected at step S201, and in the case of the state of OFF, the setting for the moment of not-using the virtual coin is selected at step S202. In this case, the change of setting may be caused by changing the game programs, or may be caused by changing data, parameters or the like in a program. The game setting which should be switched depending on whether the virtual coin is being used or not may be related to the play charge, or may be related to game contents not related to the play charge, such as a difficulty level, a character or a stage. With respect to the charge setting, though the change of minimum charge mentioned above is one example, some other examples will be described. For example, the additional charge of play charge (the continuation charge) may be segmentalized depending on a game result so that the better the game result at the moment of continuing the game is, the lower the continuation charge is made, the continuation charge being required in the case of continuing the game at the end of one time of play. As the other example of the charge setting, the pay-as-you-go charge setting may be established in such a way that the user 9 is made to select, at the moment of using the virtual coin, his/her play time of a game in units of time shorter than play time of one time at the moment of not using the virtual coin, and the longer the selected play time is, the usage charge is made higher. Moreover, by utilizing the virtual coin's feature that small amount of charge setting is possible, it is possible to provide various kinds of play embodiments relating to the play charge. The following embodiments may be established in exchange of using the virtual coin: an embodiment that provided with small amount of money is a play situation that only so-called "boss character" is set as a target to be attacked in a shooting game; an embodiment that a customized item of a character appearing in a role playing game or the like is possible to be bought with small amount of money by using the virtual coin; and an embodiment that, in a racing game, only necessary amount of fuel for driving is bought by using the virtual coin.

In the above description, when the virtual money is used, it is necessary to require the user 9 to pay the usage charge of the virtual money by the real cash, and necessary to pay to the operator 2 the usage charge of the game terminal 3 by real cash. Namely, required is the transaction based on real cash corresponding to the usage of the virtual money. As the settlement to the user 9, for example, the user 9 is made register on the user site 40 or the other site in advance, a settlement way such as a credit card in association with his/her user ID, or the user 9 is made input, as well as the replenishment amount, settlement information such as a credit card for using the settlement, and, when the virtual money is replenished, the amount of real cash equal to the charge amount can be settled by the credit card. On the other hand, the payment to the operator may be executed as followings: The consumption amount of each store code is tallied for each appropriate period (for example, one month) by referring to the coin consumption information 290 of the coin tallying database 29 (FIG. 4), and the tallied consumption amount, from which a fixed service charge (a tarried amount of the consumption amount multiplied by the rate of substitution service fee stored in the store master 230 in shown in FIG. 3) has been subtracted, is paid by real cash from the service manager 4 to the operator 2.

In the above embodiment, the management system 22 of the server apparatus 5 functions as the ID association management device by making the card management system 25 execute the processes of steps S12 and 13 in FIG. 8. The balance management system 30 functions as a virtual money addition device by executing the processes of steps 22 and 23 shown in FIG. 9. Moreover, the coin management system 24 executes the processes of steps S32 and 33 shown in FIG. 10 and the balance management system 30 executes the process of step S34 shown in FIG. 10. Thereby, a combination of the management system 22 and the balance management system 30 functions as the virtual-money consumption device. The balance management system 30 executes the process of step S35 shown in FIG. 10 and the coin management system 24 executes the process of step S36 shown in FIG. 10. Thereby a combination of the management system 22 and the balance management system 30 functions as the transaction result transmission device.

The control unit 50 of the game terminal 3 functions as the usage management device by executing the processes of steps S122 to S132 shown in FIG. 12. Moreover, the card management system 25 and the game management system 100 of the server apparatus 5 functions as the user data management device by transmitting play data stored in the game management database 101 in response to the requirement (refer to step S117 shown in FIG. 11) from the game terminal 3, or storing in the game management database 101 play data transmitted from the game terminal 3. The control unit 50 of the game terminal 50 functions as the game setting control device by executing the process shown in FIG. 13.

The present invention is not limited to the above embodiment, and may be executed in various embodiments. For example, in the above embodiment, the game terminal 3 corresponds to the charging-target terminal apparatus and the game terminal 3 itself is set as a charging target. However, the situation may be changed to the situation that a plurality of game terminals 3 are set as one charging unit, the charging-target terminal apparatus is provided to the unit, and usage charges for the game terminals 3 are paid in a lump sum by virtual money. Alternatively, adopted may be the following embodiment that the facility where the game terminal 3 is installed is set as a charging unit, and the charging-target terminal apparatus is provided to the unit. The game terminal is not limited to the one for commercial use, also may be a game machine for home use, a personal computer or a portable terminal where some game software is installed or the like. At such a terminal, in a case of making it possible to use the virtual money, if there is a card reader appropriate for a standard of the card 11, the card ID can be read out by using the card reader. If there is not such a card reader, it becomes possible to use the virtual money by making the user 9 input the card number given to the card 11 and changing the input value to the card ID.

For the present invention, the medium is not limited to a card, and various kinds of media can be applied as long as a unique ID is recorded in each medium. The medium is not limited to the one which is delivered to a user via the service manager or the operator. For example, a USB memory, a portable telephone where an IC chip is installed, or the like can be used as the medium. The medium ID is not limited to the electrically recorded, and can be recorded in an optically readable state such as a bar code or in a state that a user can recognize the medium ID like the card number in the above embodiment. In this case, the charging-target terminal apparatus may have an input apparatus where the medium ID represented by alphanumeric and the like can be inputted. The charging target which is used by a user is not limited to an amusement terminal or an amusement facility, and applied can be various kinds of terminals or facilities where a cared or the other medium to which a unique medium ID is given is used. For example, in a case that the charge payment system of the present invention is applied to a sports facility, a training machine installed to the facility or the facility itself can be set as the charging target.

In the above embodiment, while the user terminal apparatus 10 is used as the terminal apparatus for association and the terminal apparatus for addition, the charging-target terminal apparatus exists as a different terminal which is physically separated from those apparatuses. However, the charging-target terminal apparatus, the terminal apparatus for association, and the terminal apparatus for addition may be physically separated from each other, or at least two of them may be established in one terminal apparatus. For example, in a case that a terminal apparatus having a computer unit is set as the charging-target terminal apparatus and the use thereof is charged, by installing to the terminal apparatus, software for establishing the function as the charging-target terminal apparatus and software for establishing at least one function of the terminal apparatus for association or the terminal apparatus for addition, it may be configured that a single terminal apparatus can provide the association between the IDs, or the addition and subtraction of the virtual money and the non-free services to users. In the above embodiment, the user ID and the additional amount are transmitted to the server 5 from the user terminal 10 as the terminal apparatus for addition, and the virtual coin is replenished. However, It is enough if the terminal apparatus for addition of the present invention can transmit the additional amount and either the user ID or the card ID to the server apparatus. In a case that the card ID and the additional amount are transmitted to the server apparatus from the terminal apparatus for addition, it may be executed that the user ID associated with the card ID is specified at the server apparatus, the account associated with the user ID is specified, and the additional amount is added to the balance of the account.

As further example of the terminal apparatus for addition, it may be applied that installed to an amusement facility or the like is a replenishment machine which is configured to transmit to the server apparatus the user ID and the additional amount when the user ID is inputted and the cash is deposited, and the replenishment machine is made function as the terminal apparatus for addition. Additionally, it may be applied that the game terminal 3 itself in the above mentioned embodiment is made function as the terminal apparatus for addition. One of these modified examples is shown in FIG. 14.

Figure 14:
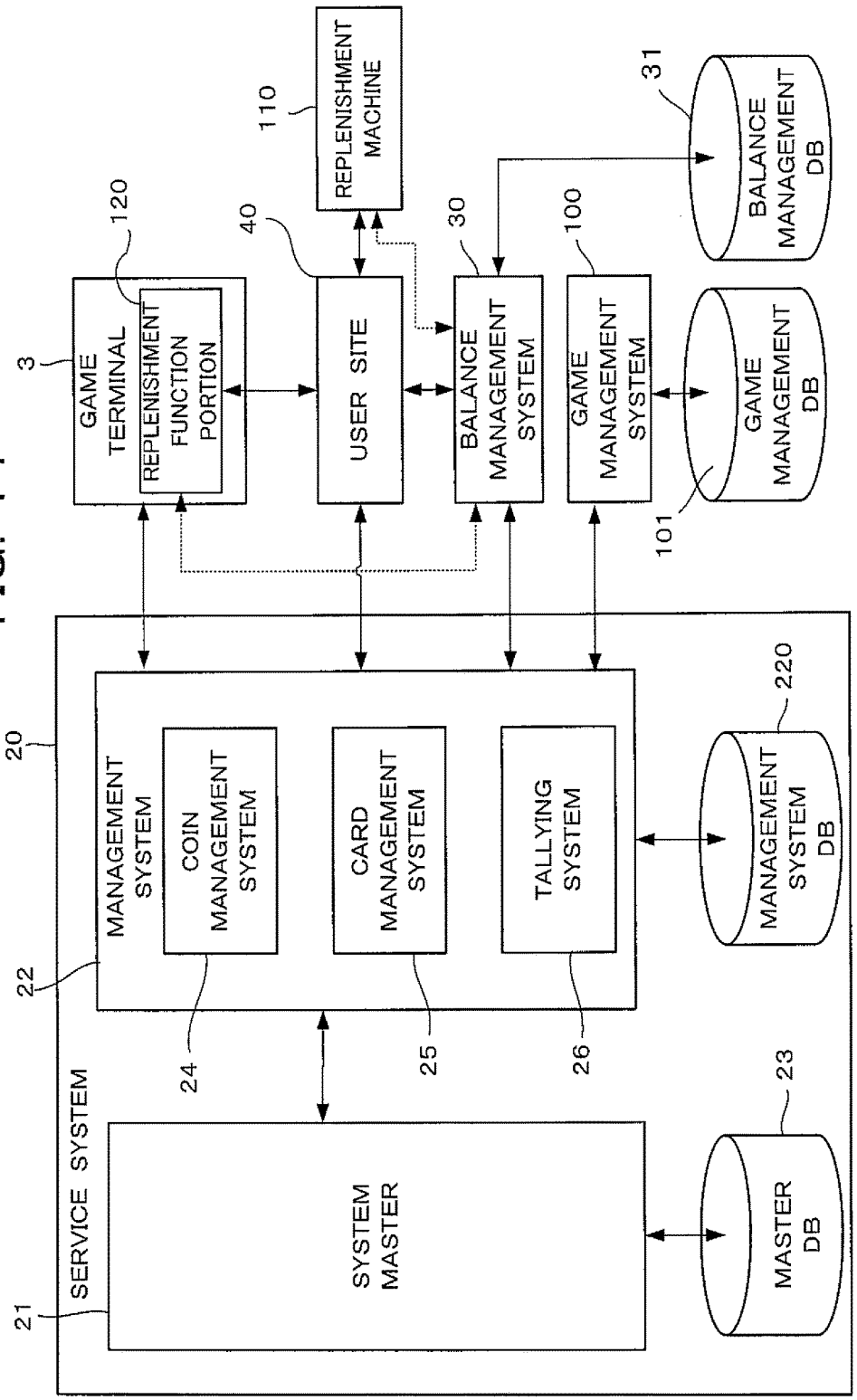
FIG. 14 is a diagram showing a modified example of FIG. 2.

In the example shown in FIG. 14, a replenishment machine 110 is provided, and a replenishment function portion 120 is provided in the game terminal 3, the replenishment function portion 120 making the game terminal 3 function as the terminal apparatus for addition. Both of the replenishment machine 110 and the replenishment function portion 120 of the game terminal 3 capable of accessing the user site 40. If the information including the user ID and the additional amount are transmitted to the user site 40 from either the replenishment machine 110 or the replenishment function portion 120 of the game terminal 3, after that, it is possible to replenishment the virtual coin in the account in the similar way to the way in FIG. 9. The replenishment machine 110 is possible to be installed in a store or an appropriate place. In addition, in a case that the virtual coin is replenished from the replenishment machine 110 or the game terminal 3, the value amount corresponding to the additional amount may be settled by real cash at the same time, by requiring a user to deposit the cash or input credit card information. Moreover, it may be applied that the replenishment machine 110 or the game terminal 3 is configured so that a user can input both his/her user ID and the card ID to function as the terminal apparatus for association. The virtual coin may be replenished by accessing directly to the balance management system 30 from the replenishment machine 110 or the game terminal 3.

In the above mentioned embodiment, though the charging-target terminal apparatus controls the usage of charging target depending on whether the consumption of the virtual money has succeeded or not, the present invention is not limited to this embodiment. For example, in the charging-target terminal apparatus, only possible are the input of the medium ID and the consumption amount and the output indicating whether the consumption has succeeded. It is only displayed in accordance with the transaction result information transmitted from the server apparatus, at the charging-target terminal apparatus whether the payment of virtual money has succeeded or not, and the operator may determine whether the usage by the user is permitted or not depending on the display. Moreover, even if the charging-target terminal apparatus has a function of transmitting and receiving the user data, omitted may be the function that the charging-target terminal apparatus reflects the usage of a user on the user data. For example, in a case that the charging target is a sports facility, a rehabilitation facility or the like, and the user data indicates a past usage history of the user, it may be applied that the user data transmitted from the server apparatus is displayed at the charging-target terminal apparatus, and the output result is stored in another terminal apparatus or the like to be used by the user.

What is claimed is:

1. A charge payment system comprising:
   a server apparatus which is connected with a network;
   a charging-target terminal apparatus for a charging target to be used by a user, the charging-target terminal apparatus providing a game to the user as a game machine for commercial use including a first processor to receive data indicative of a medium ID outputted from a corresponding physical medium with the physical medium being portable and the medium ID being unique to and recorded in each physical medium possessed by the user to allow the user to play the game, the first processor being further configured to transmit to the server apparatus via the network, first transmission information including the medium ID;
   a terminal apparatus for association including a second processor to transmit to the server apparatus via the network, second transmission information which requires to associate a user ID unique to each user and the medium ID with each other with specifying the user ID and the medium ID, by following operations of the user; and
   a terminal apparatus for addition including a third processor to transmit to the server apparatus via the network, third transmission information including the user ID or the medium ID, and an additional amount of virtual money by following operations of the user, wherein
   the server apparatus has:
   a card management database that include a plurality of card management data records, each card management data record including a corresponding medium ID and an inside ID associated with the corresponding medium ID;
   a user ID management database that includes a plurality of user management data records, each user management data record including a user ID and an inner ID associated with the user ID; and
   a balance management database which does not store the medium IDs but stores account association data where the user ID and an account storing a balance of the virtual money are associated with each other, the balance management database being provided as a different database from the user ID management database; and
   a fourth processor configured to operate as:
   an ID association management device configured to update, in a case that the second transmission information has been transmitted from the terminal apparatus for association, ID association data included in the user ID management database and the card management database so that the user ID and the medium ID which are specified in the second transmission information are associated with each other, including:
accessing the user ID management database and identifying an inside ID associated with the corresponding user ID; and
accessing the card management database and associating the identified inside ID with the medium ID;
the ID association management device further configured to:
receive a request to play a game from a user via the charging-target terminal apparatus, the request including the medium ID and a consumption amount of virtual money; and
responsive to the request to play a game:
access the card management database and identify an inside ID that is associated with the medium ID; and
access the user ID management database and identify a user ID associated with the identified inside ID;
a virtual money addition device configured to specify, in a case that the third transmission information has been transmitted from the terminal apparatus for addition, either the user ID included in the third transmission information, or the user ID associated with the medium ID included in the third transmission information in the ID association data of the user ID management database and the card management database, to specify a virtual money account associated with the user ID specified by referring to the account association data of the balance management database, and to add the additional amount to a balance of the virtual money account specified;
a virtual money consumption device configured to specify, in a case that information including the medium ID and a consumption amount of the virtual money is transmitted from the charging-target terminal apparatus as the first transmission information, the user ID associated with the medium ID included in the first transmission information referring to the ID association data of the user ID management database and the card management database, to specify the virtual money account associated with the user ID specified by referring to the account association data of the balance management database, to subtract the consumption amount from the balance of the virtual money account when the balance is not less than the consumption amount, and to stop the subtraction of the consumption amount when the balance is less than the consumption amount; and
a transaction result transmission device configured to transmit to the charging-target terminal apparatus, transaction result information including information indicating whether the subtraction of the consumption amount has succeeded or not, wherein the server further has:
a game management database which does not store the user IDs but stores user data in association with the medium ID so as to be specified to be used at the changing target, the game management database being provided as a database different from the management system database and the balance management database; and
the fourth processor further including a user data management device configured to, in a case that information including the medium ID and the user data has been transmitted as the first transmission information from the charging-target terminal apparatus, store the user data in association with the medium ID in the game management database, and, in a case that information including the medium ID and a transmission requirement of user data associated with the medium ID has been transmitted as the first transmission information from the charging-target terminal apparatus, refer to the game management database and transmit the user data associated with the medium ID to the charging-target terminal apparatus.

2. The charge payment system of claim 1, wherein the charging-target terminal apparatus includes a usage management device configured to control usage of the charging target based on the transaction result information from the transaction result transmission device.

3. The charge payment system of claim 1, wherein the charging-target terminal apparatus's configured to update the user data by reflecting operations of the user when the user uses the charging target.

4. The charge payment system of claim 1, wherein the charging-target terminal apparatus is configured to function as a game terminal that permits the user to play a game, and updates play data as the user data by reflecting play contents of the game.

5. The charge payment system of claim 4, wherein the game terminal has a game setting control device configured to determine based on the transaction result information whether a play charge of the game has been paid or not, and changes a setting of the game depending on the determination result.

6. The charge payment system of claim 1, wherein a website for the user is established by the server apparatus, the website being available via the internet as the network at the terminal apparatus for association, and information can be exchanged via the website between the terminal apparatus for association and the ID association management device.

7. A server apparatus, which is connected via a network with each of a charging-target terminal apparatus, a terminal apparatus for association and a terminal apparatus for addition, the charging-target terminal apparatus providing a game to a user as a game machine for commercial use and configured to receive data indicative of a medium ID outputted from a corresponding physical medium with the physical medium being portable and the medium ID being unique to and recorded in each physical medium possessed by the user to allow the user to play the game, and transmit first transmission information including the medium ID, the terminal apparatus for association transmitting second transmission information which requires to associate a user ID unique to each user and the medium ID with each other with specifying the user ID and the medium ID, by following operations of the user, and the terminal apparatus for addition transmitting third transmission information including the user ID or the medium ID as well as an additional amount of virtual money by following operations of the user, the server apparatus comprising:
a card management database that include a plurality of card management data records, each card management data record including a corresponding medium ID and an inside ID associated with the corresponding medium ID;
a user ID management database that includes a plurality of user management data records, each user management data record including a user ID and an inner ID associated with the user ID; and a balance management database which does not store the medium IDs but stores account association data where the user ID and an account storing a balance of the virtual money are associated with each other, the balance management database being provided as a different database from the user ID management database; and a processor configured to operate as:

an ID association management device configured to update, in a case that the second transmission information has been transmitted from the terminal apparatus for association, ID association data included in the user ID management database and the card management database so that the user ID and the medium ID which are specified in the second transmission information are associated with each other, including:

accessing the user ID management database and identifying an inside ID associated with the corresponding user ID; and accessing the card management database and associating the identified inside ID with the medium ID;

the ID association management device further configured to:

receive a request to play a game from a user via the charging-target terminal apparatus, the request including the medium ID and a consumption amount of virtual money; and responsive to the request to play a game:

access the card management database and identify an inside ID that is associated with the medium ID; and access the user ID management database and identify a user ID associated with the identified inside ID;

a virtual money addition device configured to specify, in a case that the third transmission information has been transmitted from the terminal apparatus for addition, either the user ID included in the third transmission information, or the user ID associated with the medium ID included in the third transmission information in the ID association data of the user ID management database and the card management database, to specify a virtual money account associated with the user ID specified by referring to the account association data of the balance management database, and to add the additional amount to a balance of the virtual money account specified;

a virtual money consumption device configured to specify, in a case that information including the medium ID and a consumption amount of the virtual money is transmitted from the charging-target terminal apparatus as the first transmission information, the user ID associated with the medium ID included in the first transmission information referring to the ID association data of the user ID management database and the card management database, to specify the virtual money account associated with the user ID specified by referring to the account association data of the balance management database, to subtract the consumption amount from the balance of the virtual money account when the balance is not less than the consumption amount, and to stop the subtraction of the consumption amount when the balance is less than the consumption amount; and a transaction result transmission device configured to transmit to the charging-target terminal apparatus, transaction result information including information indicating whether the subtraction of the consumption amount has succeeded or not, wherein the server further has:

a game management database which does not store the user IDs but stores user data in association with the medium ID so as to be specified to be used at the changing target, the game management database being provided as a database different from the management system database and the balance management database; and the processor being further configured to operate as a user data management device configured to, in a case that information including the medium ID and the user data has been transmitted as the first transmission information from the charging-target terminal apparatus, store the user data in association with the medium ID in the game management database, and, in a case that information including the medium ID and a transmission requirement of user data associated with the medium ID has been transmitted as the first transmission information from the charging-target terminal apparatus, refer to the game management database and transmit the user data associated with the medium ID to the charging-target terminal apparatus.

8. A non-transitory computer-readable storage medium storing instructions for a server apparatus, the server apparatus being connected via a network with each of a charging-target terminal apparatus, a terminal apparatus for association and a terminal apparatus for addition, the charging-target terminal apparatus being provided as a game machine for providing a game to a user and receiving data indicative of a medium ID outputted from a corresponding physical medium with the physical medium being portable and the medium ID being unique to and recorded in each physical medium possessed by the user to allow the user to play the game, the charging-target terminal apparatus transmitting first transmission information including the medium ID, the terminal apparatus for association having a processor configured to transmit second transmission information which requires to associate a user ID unique to each user and the medium ID with each other with specifying the user ID and the medium ID by following operations of the user, and the terminal apparatus for addition having a processor configured to transmit third transmission information including the user ID or the medium ID as well as an additional amount of virtual money by following operations of the user, and the server apparatus having a card management database that include a plurality of card management data records including corresponding medium IDs and inside IDs associated with the corresponding medium ID, a user ID management database that includes a plurality of user management data records including user IDs and inner IDs associated with the user ID, and a balance management database which does not store the medium IDs but stores account association data where the user ID and an account storing a balance of the virtual money are associated with each other, the balance management database being provided as a different database from the user ID management database; a game management database which does not store the user IDs but stores user data in association with the medium ID so as to be specified to be used at the changing target, the game management database being provided as a database different from the management system database and the balance management database; and a server processor, wherein the instructions makes the server processor of the server apparatus to operate as:

an ID association management device configured to update, in a case that the second transmission information has been transmitted from the terminal apparatus for association, ID association data included in the user ID management database and the card management database so that the user ID and the medium ID which are specified in the second transmission information are associated with each other, including:

accessing the user ID management database and identifying an inside ID associated with the corresponding user ID; and accessing the card management database and associating the identified inside ID with the medium ID;

the ID association management device further configured to:

receive a request to play a game from a user via the charging-target terminal apparatus, the request including the medium ID and a consumption amount of virtual money; and responsive to the request to play a game:

access the card management database and identify an inside ID that is associated with the medium ID; and access the user ID management database and identify a user ID associated with the identified inside ID;

a virtual money addition device configured to specify, in a case that the third transmission information has been transmitted from the terminal apparatus for addition, either the user ID included in the third transmission information, or the user ID associated with the medium ID included in the third transmission information in the ID association data of the user ID management database and the card management database, to specify a virtual money account associated with the user ID specified by referring to the account association data of the balance management database, and to add the additional amount to a balance of the virtual money account specified;

a virtual money consumption device configured to specify, in a case that information including the medium ID and a consumption amount of the virtual money is transmitted from the charging-target terminal apparatus as the first transmission information, the user ID associated with the medium ID included in the first transmission information referring to the ID association data of the user ID management database and the card management database, to specify the virtual money account associated with the user ID specified by referring to the account association data of the balance management database, to subtract the consumption amount from the balance of the virtual money account when the balance is not less than the consumption amount, and to stop the subtraction of the consumption amount when the balance is less than the consumption amount;

a transaction result transmission device configured to transmit to the charging-target terminal apparatus, transaction result information including information indicating whether the subtraction of the consumption amount has succeeded or not; and a user data management device configured to, in a case that information including the medium ID and the user data has been transmitted as the first transmission information from the charging-target terminal apparatus, store the user data in association with the medium ID in the game management database, and, in a case that information including the medium ID and a transmission requirement of user data associated with the medium ID has been transmitted as the first transmission information from the charging-target terminal apparatus, refer to the game management database and transmit the user data associated with the medium ID to the charging-target terminal apparatus.

9. A charge payment system comprising:

a game terminal configured to allow a user to play a game, the game terminal configured to receive, from the user, a request to play the game including a unique medium ID and a consumption amount of virtual money, the unique medium ID being unique to and recorded in a physical medium possessed by the user with the physical medium being portable, the game terminal including an input device physical medium reader for receiving the physical medium from the user and retrieving the medium ID from the physical medium;

a server apparatus connected to a card issuing device configured to issue physical medium to the user and the game terminal, the server apparatus including:

a card management database that include a plurality of card management data records, each card management data record including a corresponding medium ID and an inside ID associated with the corresponding medium ID;

a user ID management database that includes a plurality of user management data records, each user management data record including a user ID and an inner ID associated with the user ID;

a balance management database which does not store the medium IDs but stores account association data where the user ID and an account storing a balance of virtual money are associated with each other, the balance management database being provided as a different database from the user ID management systems database; and a server processor connected to the database, the server processor being configured to:

receive a request from a user via a webpage to associate a corresponding user ID with a medium ID and responsive to receiving the request:

access the user ID management database and identify an inside ID associated with the corresponding user ID; and access the card management database and associate the identified inside ID with the medium ID;

receive a request to play a game from the game terminal, the request including the medium ID and a consumption amount of virtual money; and responsive to the request to play a game:

access the card management database and identify an inside ID that is associated with the medium ID;

access the user ID management database and identify a user ID associated with the identified inside ID;

identify the virtual money account associated with the identified user ID; and transmit a transaction result to the game terminal indicative of whether the requested consumption amount may be subtracted from the associated virtual money account.

10. The charge payment system of claim 9, wherein the server processor is configured to receive a request from the user to associate another medium ID with the user ID, access the user ID management database and identify the inner ID corresponding to the user ID, and access the card management database and update the card management data record to associate the another medium ID with inner ID associated with the user ID in response to the user request.

11. The charge payment system of claim 9, wherein the server processor is configured to receive a request from the user to add an amount of virtual money to a virtual money account, the request including a user ID, the server processor configured to identify the virtual money account associated with the received user ID and add the virtual money amount to the identified virtual money account in response to the user request.

12. The charge payment system of claim 1, wherein the charging-target terminal further includes a physical medium reader for receiving the physical medium from the user and retrieving the medium ID from the physical medium, and wherein the first processor is configured to receive the medium ID as an output from the physical medium reader.

13. The server apparatus of claim 7, wherein the terminal apparatus further includes a physical medium reader for receiving the physical medium from the user and retrieving the medium ID from the physical medium, and configured to receive the medium ID as an output from the physical medium reader.

14. The non-transitory computer-readable storage medium of claim 8 wherein the terminal apparatus further includes a physical medium reader for receiving the physical medium from the user and retrieving the medium ID from the physical medium, and wherein the the server processor of the server apparatus is further configured to receive the medium ID as an output from the physical medium reader.

\* \* \* \* \*

UNITED STATES PATENT AND TRADEMARK OFFICE
CERTIFICATE OF CORRECTION

PATENT NO. : 10,013,687 B2
APPLICATION NO. : 13/266382
DATED : July 3, 2018
INVENTOR(S) : Keina Kanisawa Page 1 of 1

It is certified that error appears in the above-identified patent and that said Letters Patent is hereby corrected as shown below:

In the Claims

Column 26, Line 17 Claim 3: Please delete "terminal apparatus's configured" and replace with --terminal apparatus is configured--

Column 31, Line 25 Claim 14: Please delete "wherein the the server" and replace with --wherein the server--

Signed and Sealed this
Twenty-fifth Day of September, 2018

Andrei Iancu
*Director of the United States Patent and Trademark Office*